(12) United States Patent
Shinobu

(10) Patent No.: US 12,535,651 B2
(45) Date of Patent: Jan. 27, 2026

(54) DISPLAY OPTICAL SYSTEM, DISPLAY APPARATUS, AND IMAGE PICKUP APPARATUS

(71) Applicant: CANON KABUSHIKI KAISHA, Tokyo (JP)

(72) Inventor: Fumihiro Shinobu, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 317 days.

(21) Appl. No.: 18/177,626

(22) Filed: Mar. 2, 2023

(65) Prior Publication Data

US 2023/0288666 A1   Sep. 14, 2023

(30) Foreign Application Priority Data

Mar. 9, 2022   (JP) ................. 2022-036226

(51) Int. Cl.
| | | |
|---|---|---|
| *G02B 9/60* | (2006.01) | |
| *G02B 9/62* | (2006.01) | |
| *G02B 13/18* | (2006.01) | |
| *G06F 1/16* | (2006.01) | |
| *H04N 23/53* | (2023.01) | |

(52) U.S. Cl.
CPC ............. *G02B 9/60* (2013.01); *G02B 13/18* (2013.01); *G06F 1/163* (2013.01); *G02B 9/62* (2013.01); *H04N 23/53* (2023.01)

(58) Field of Classification Search
CPC ...... H04N 23/23; H04N 5/2254; H04N 5/222; G06F 1/163; G02B 9/60; G02B 9/62; G02B 9/64; G02B 13/18; G02B 13/16; G02B 13/0015; G02B 13/0045; G02B 27/0172; G02B 27/0012; G02B 27/0025; G02B 15/146
USPC ....... 359/756–762, 769, 656, 658, 708, 713, 359/749
See application file for complete search history.

(56) References Cited

U.S. PATENT DOCUMENTS

| | | | |
|---|---|---|---|
| 2016/0282588 A1* | 9/2016 | Sekine | G02B 13/0045 |
| 2019/0154956 A1* | 5/2019 | Wang | G02B 13/0025 |

FOREIGN PATENT DOCUMENTS

| | | |
|---|---|---|
| JP | H095649 A | 1/1997 |
| JP | 2007212847 A | 8/2007 |
| JP | 2018028632 A | 2/2018 |
| JP | 2018-189750 A | 11/2018 |
| JP | 2023046217 A | 4/2023 |
| WO | 2019054359 A1 | 3/2019 |

* cited by examiner

*Primary Examiner* — Travis S Fissel
(74) *Attorney, Agent, or Firm* — Canon U.S.A., Inc. IP Division

(57) ABSTRACT

A display optical system configured to enable an image displayed on a display element to be observed includes, in order from a display element side to an observation side, a first lens having positive refractive power, a second lens having positive refractive power, a third lens having negative refractive power, a fourth lens having positive refractive power, and a fifth lens having positive refractive power. Each of the first lens, second lens, third lens, fourth lens, and fifth lens is a single lens that is not a cemented lens. A predetermined condition is satisfied.

18 Claims, 13 Drawing Sheets

DISPLAY OPTICAL SYSTEM, DISPLAY APPARATUS, AND IMAGE PICKUP APPARATUS

BACKGROUND

Technical Field

One of the aspects of the embodiments relates to a display optical system for a display apparatus, such as an electronic viewfinder (EVF) and a head mount display (HMD).

Description of the Related Art

A display optical system that is used to observe an image displayed on a display element such as a liquid crystal panel is to have a sufficiently wide field (high magnification), long eye relief, and sufficiently corrected aberrations. For the high magnification scheme of this display optical system, a high refractive material is suitable for lenses of the display optical system, but the high refractive material is generally expensive.

Japanese Patent Laid-Open No. ("JP") 2018-189750 discloses a display optical system that includes a first lens having positive refractive power, a second lens having negative refractive power, a third lens having positive refractive power, and a fourth lens having positive refractive power, wherein the radii of curvature of the third lens and the fourth lens are properly set. JP 2018-28632 discloses a display optical system that includes a first lens unit having positive refractive power, a second lens unit having negative refractive power, and a third lens unit having positive refractive power, wherein the lenses of the first and third lens units have meniscus shapes, and the overall lens length is properly set.

For the high magnification and sufficient eye relief of the display optical system, it is necessary to properly set a focal length and refractive index of each lens. However, if refracting power of each lens becomes high for the high magnification scheme, it becomes difficult to manufacture the lens shape or the sensitivity becomes extremely large. In addition, a display optical system that enlarges and displays an image formed on a small display element also is to properly set an arrangement of the lenses, a ratio of their refractive powers, and the like.

SUMMARY

A display optical system includes, in order from a display element side to an observation side, a first lens having positive refractive power, a second lens having positive refractive power, a third lens having negative refractive power, a fourth lens having positive refractive power, and a fifth lens having positive refractive power. Each of the first lens, second lens, third lens, fourth lens, and fifth lens is a single lens that is not a cemented lens. The following inequalities are satisfied:

$$1.700 \leq nd2$$

$$0.000 < f2/f1 \leq 0.790$$

where f1 is a focal length of the first lens, f2 is a focal length of the second lens, and nd2 is a refractive index of the second lens for d-line. A display apparatus and an image pickup apparatus each having the above system also constitute another aspect of the embodiments.

Further features of the disclosure will become apparent from the following description of embodiments with reference to the attached drawings.

DESCRIPTION OF THE EMBODIMENTS

Figure 1:
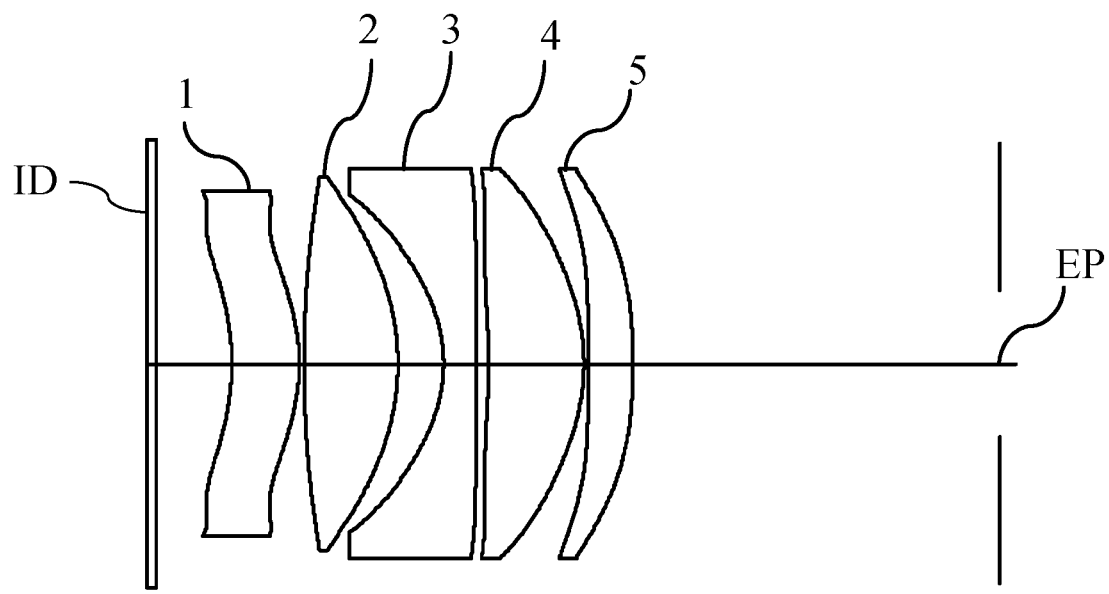
FIG. 1 is a sectional view of a display optical system according to Example 1.
Figure 2:
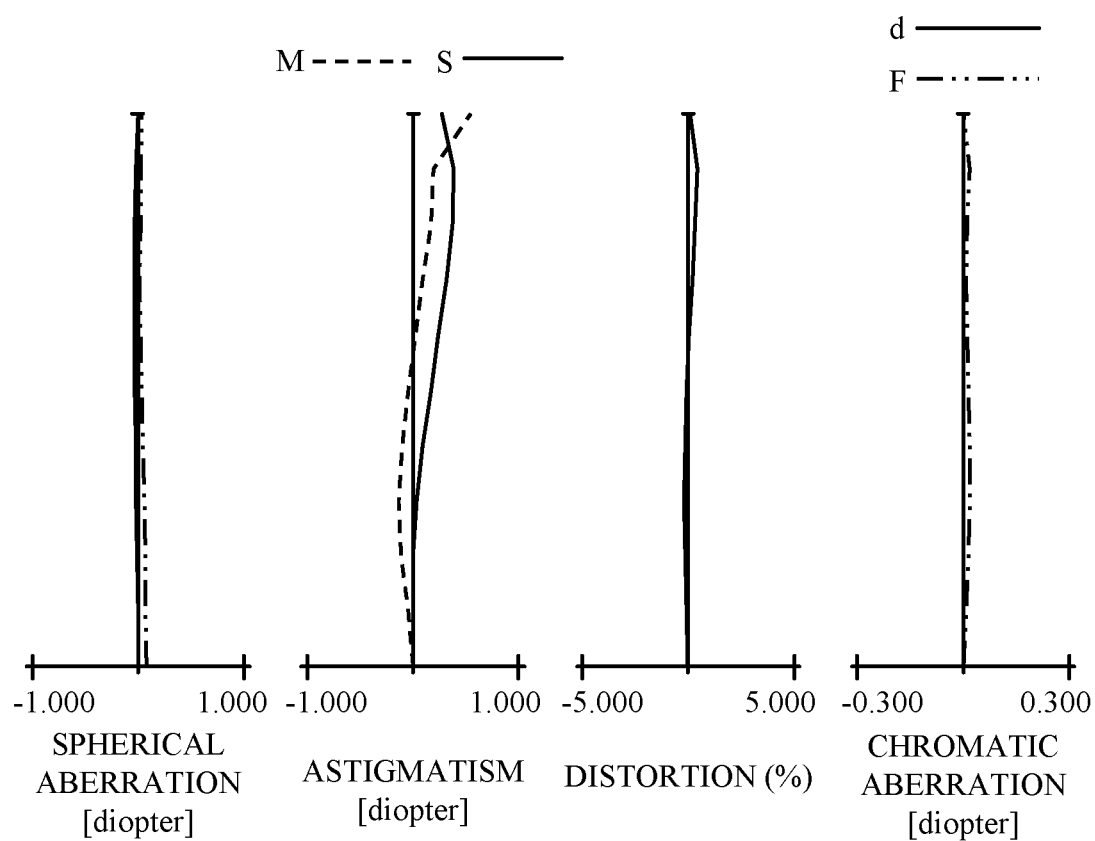
FIG. 2 is an aberration diagram of the display optical system according to Example 1.
Figure 3:
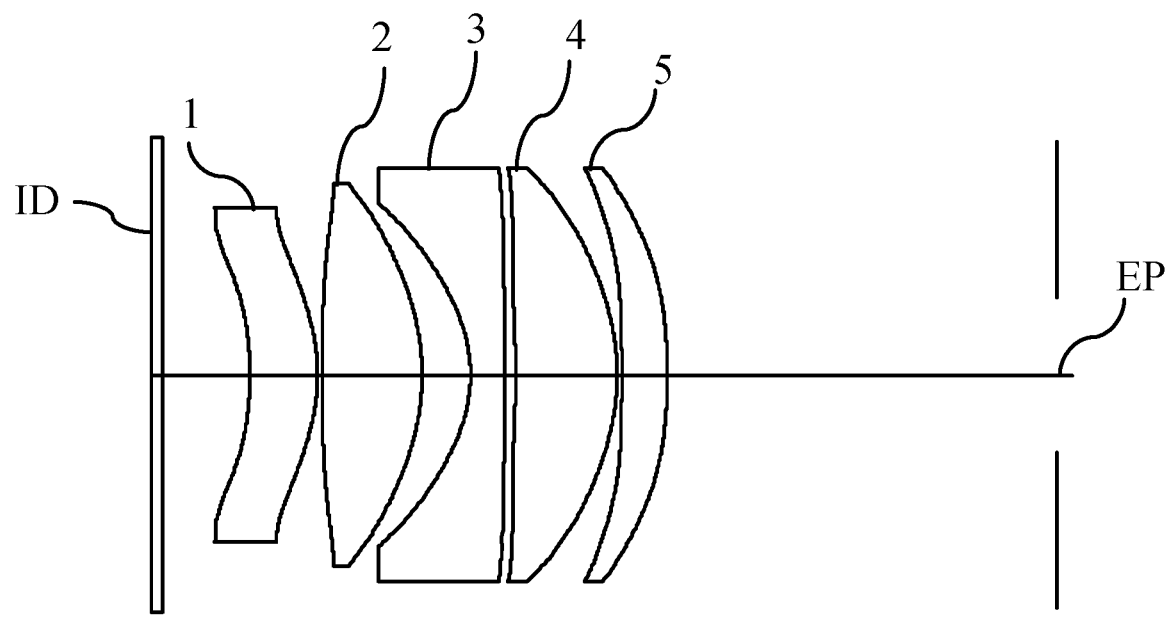
FIG. 3 is a sectional view of a display optical system according to Example 2.
Figure 4:
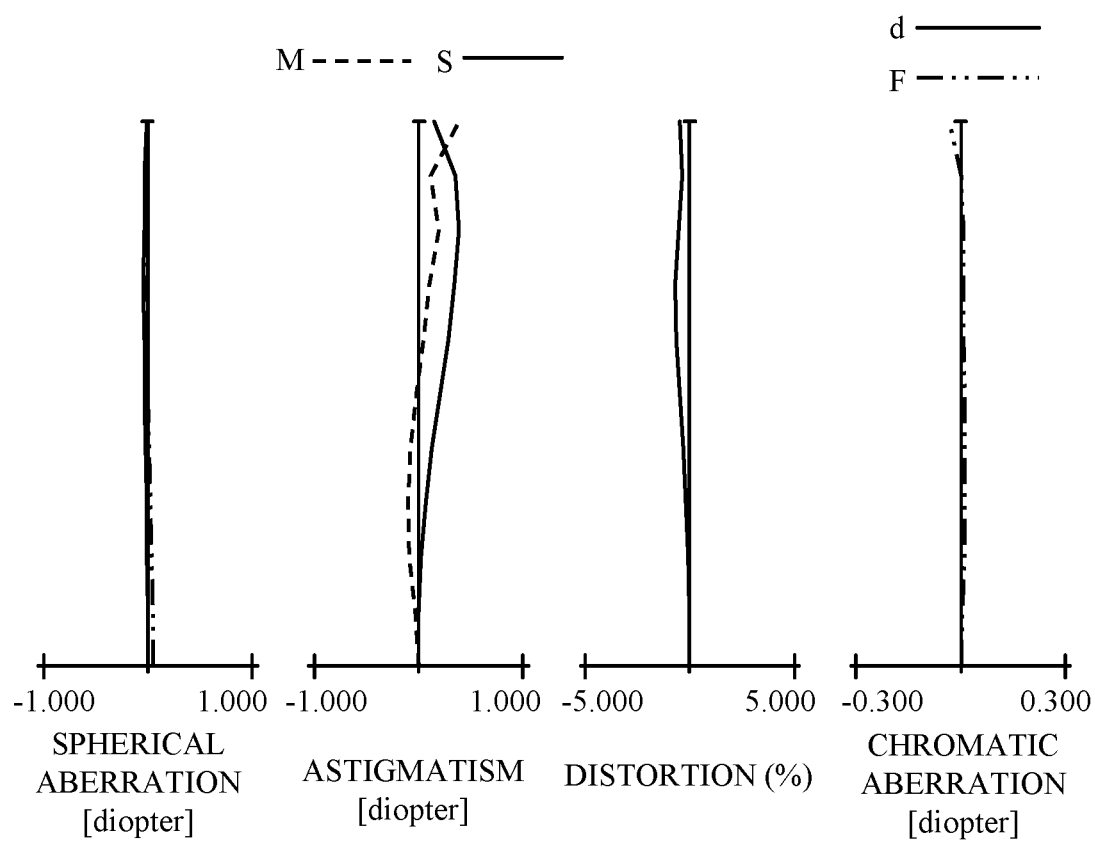
FIG. 4 is an aberration diagram of the display optical system according to Example 2.
Figure 5:
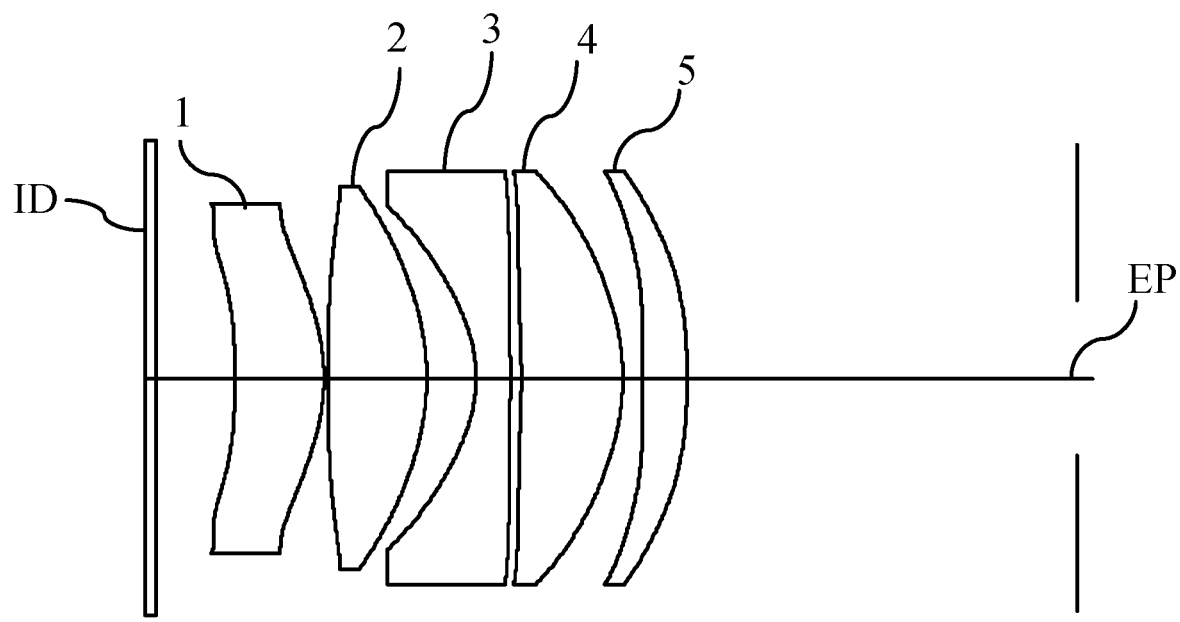
FIG. 5 is a sectional view of a display optical system according to Example 3.
Figure 6:
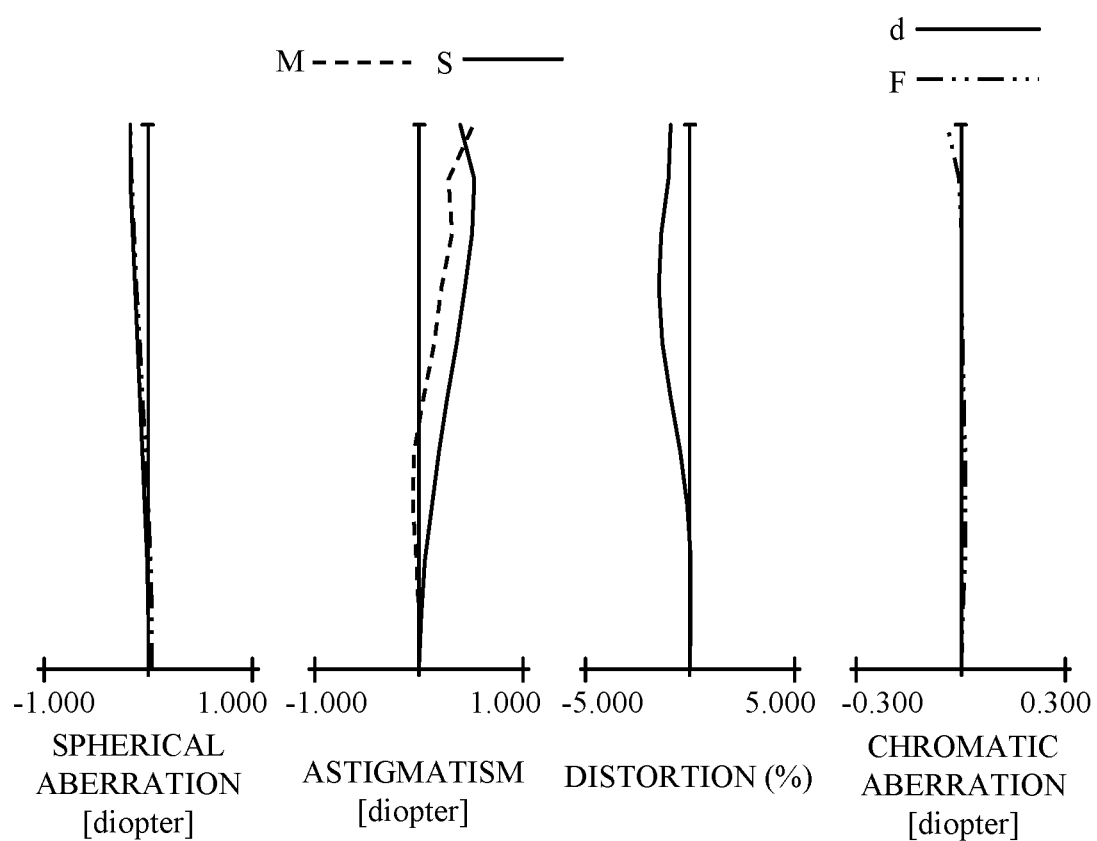
FIG. 6 is an aberration diagram of the display optical system according to Example 3.
Figure 7:
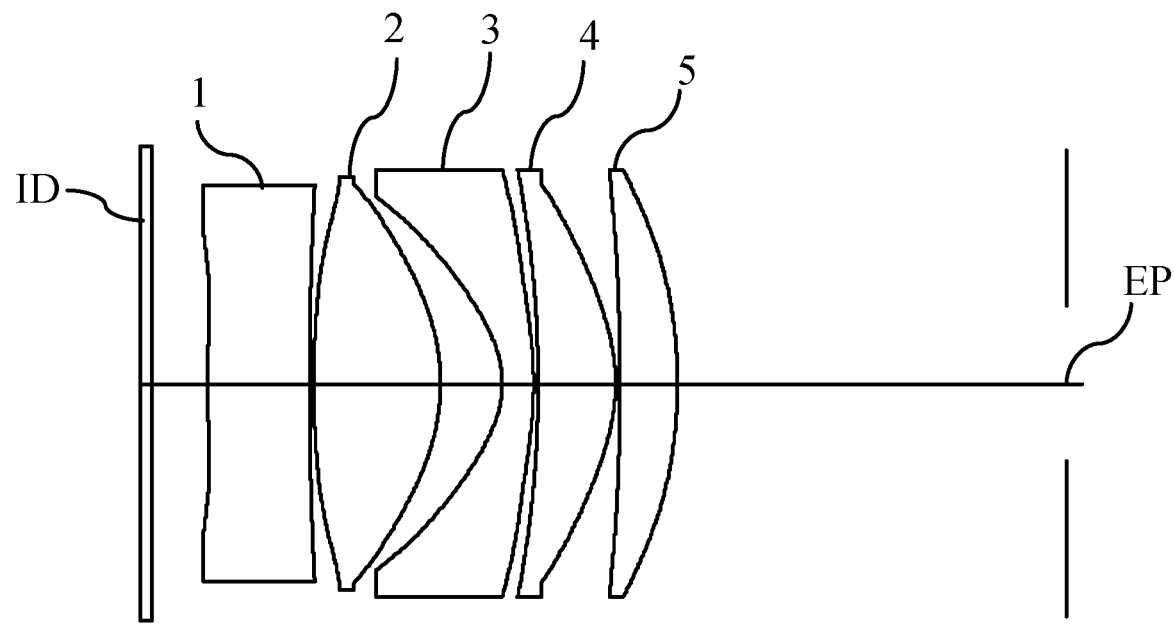
FIG. 7 is a sectional view of a display optical system according to Example 4.
Figure 8:
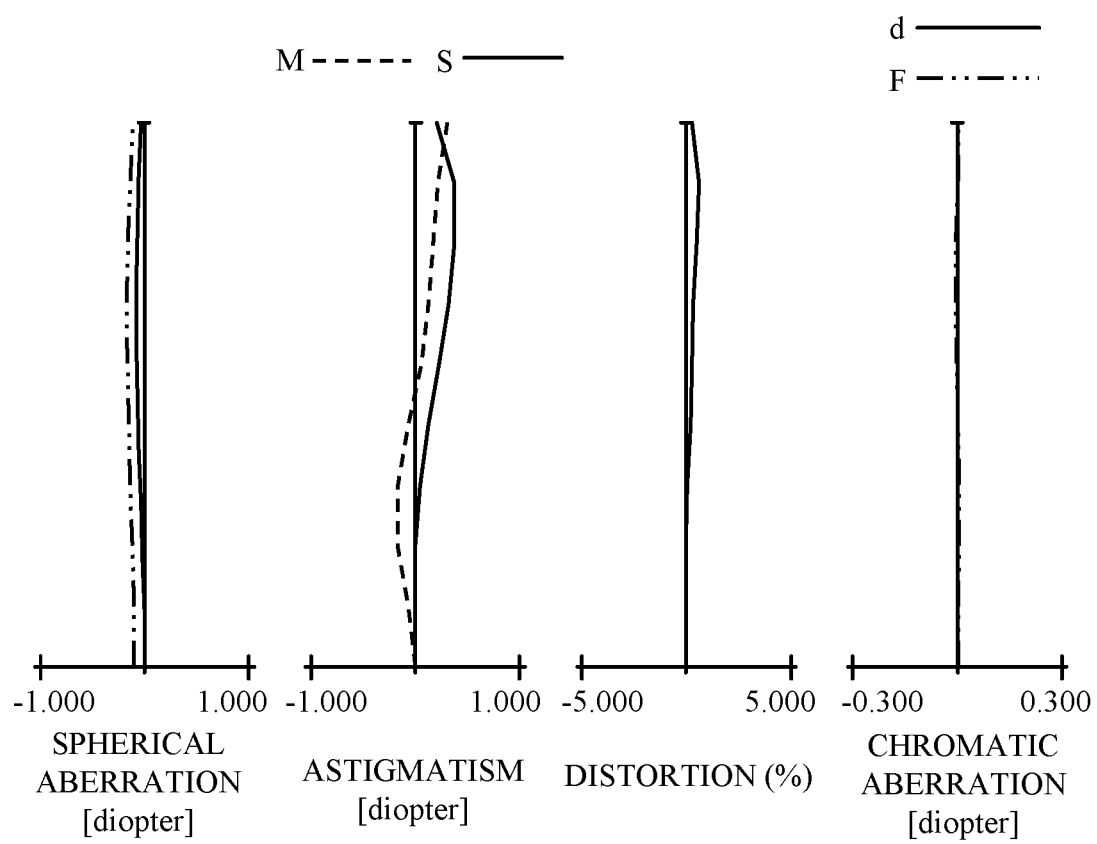
FIG. 8 is an aberration diagram of the display optical system according to Example 4.
Figure 9:
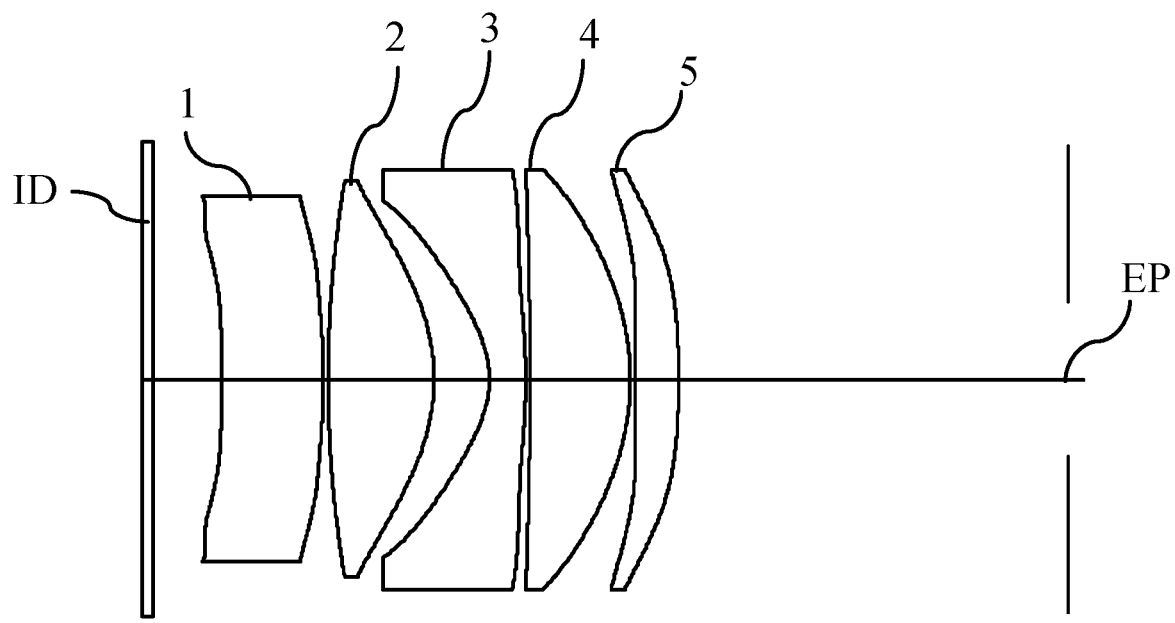
FIG. 9 is a sectional view of a display optical system according to Example 5.
Figure 10:
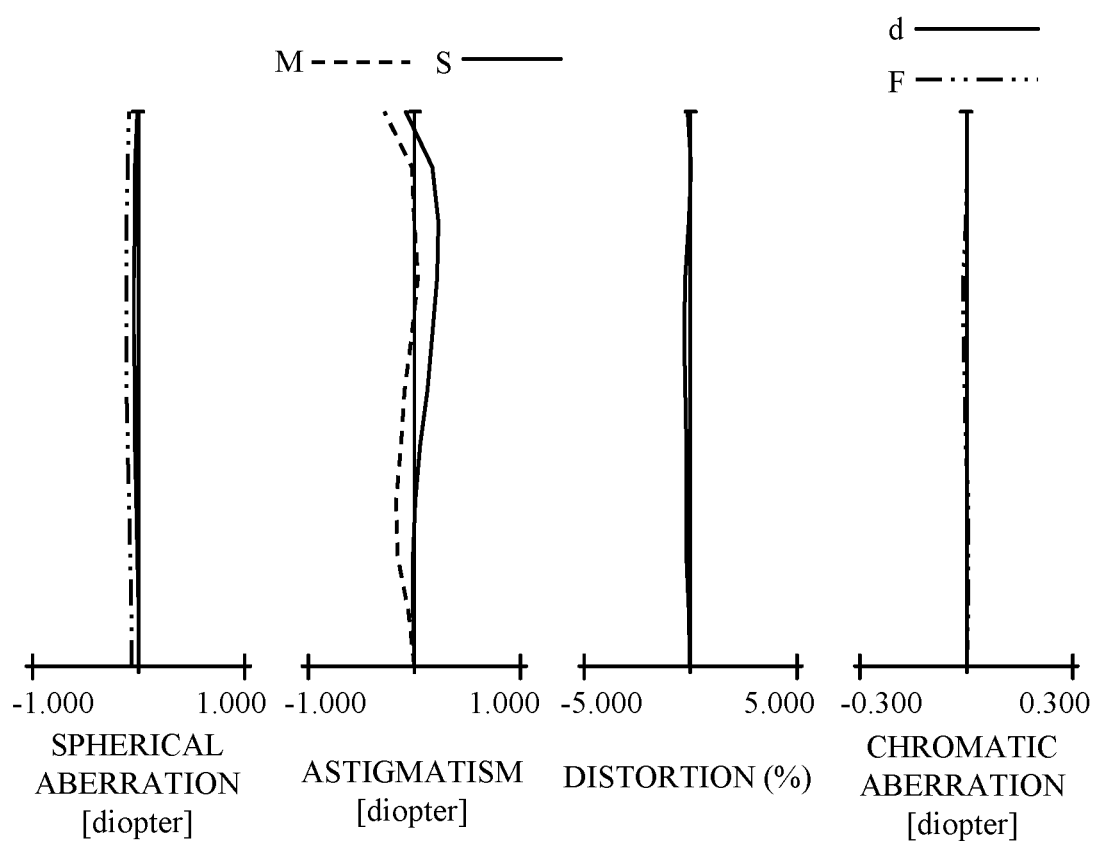
FIG. 10 is an aberration diagram of the display optical system according to Example 5.
Figure 11:
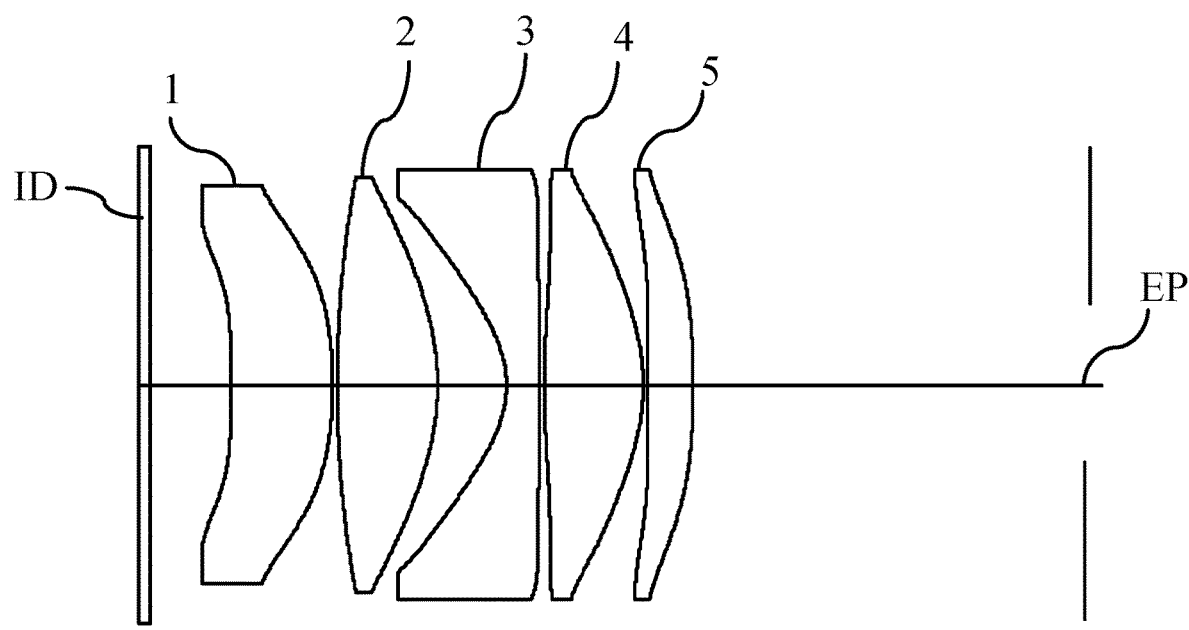
FIG. 11 is a sectional view of a display optical system according to Example 6.
Figure 12:
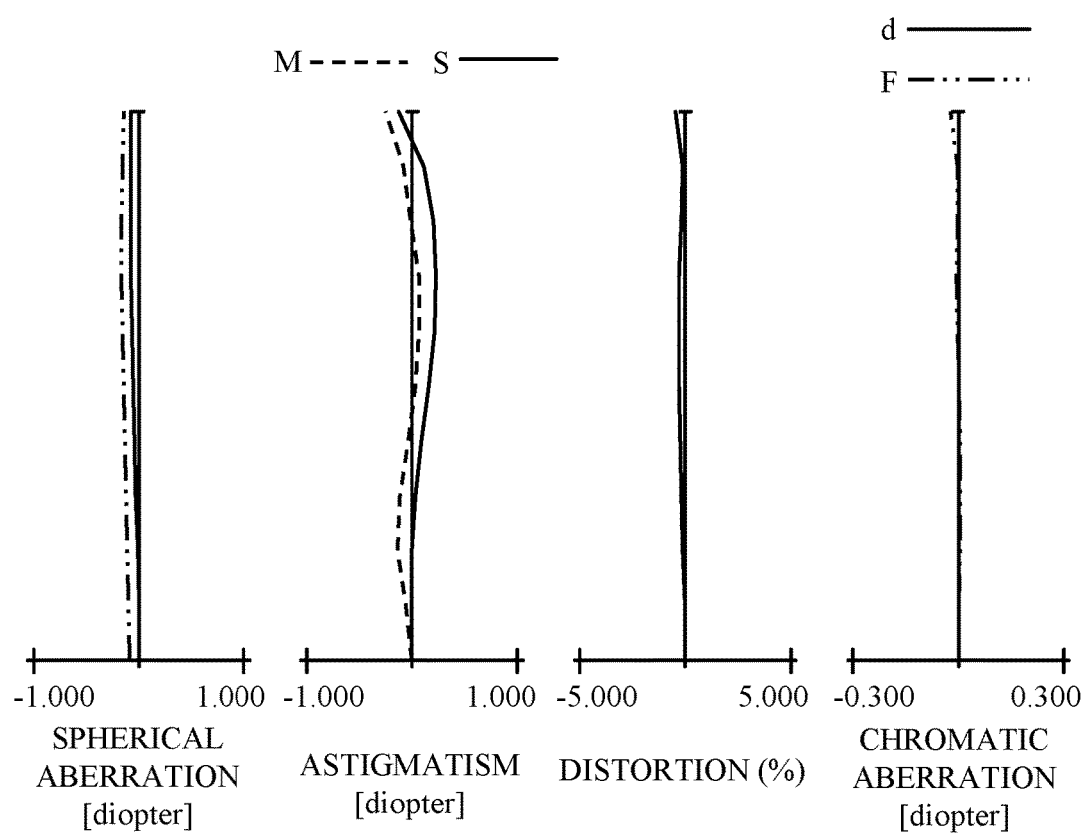
FIG. 12 is an aberration diagram of the display optical system according to Example 6.
Figure 13:
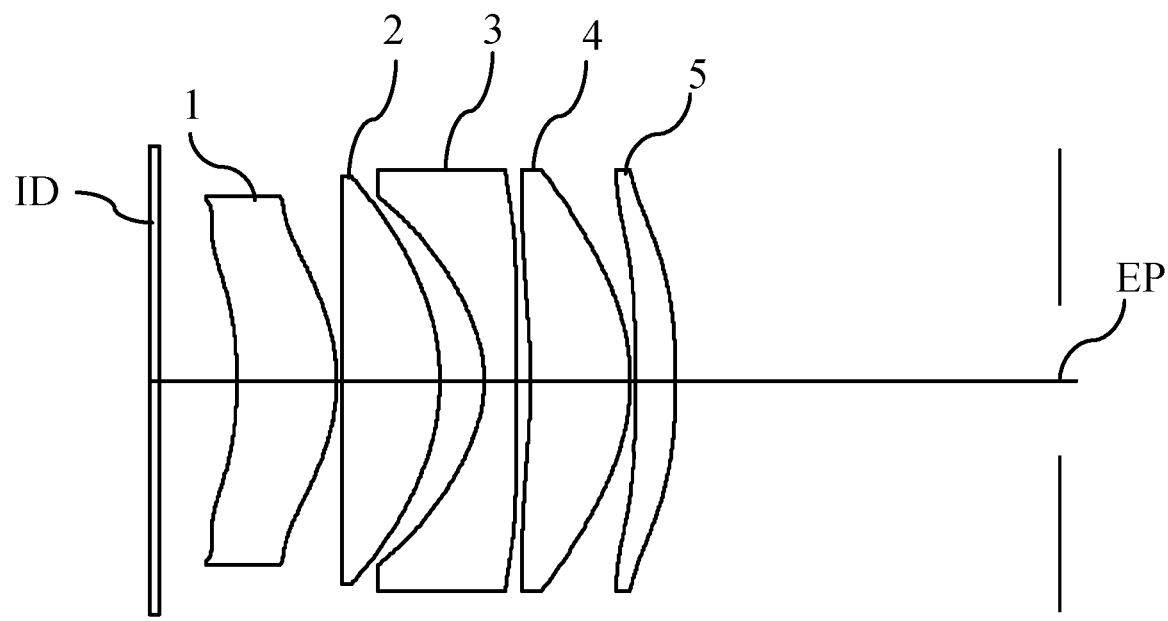
FIG. 13 is a sectional view of a display optical system according to Example 7.
Figure 14:
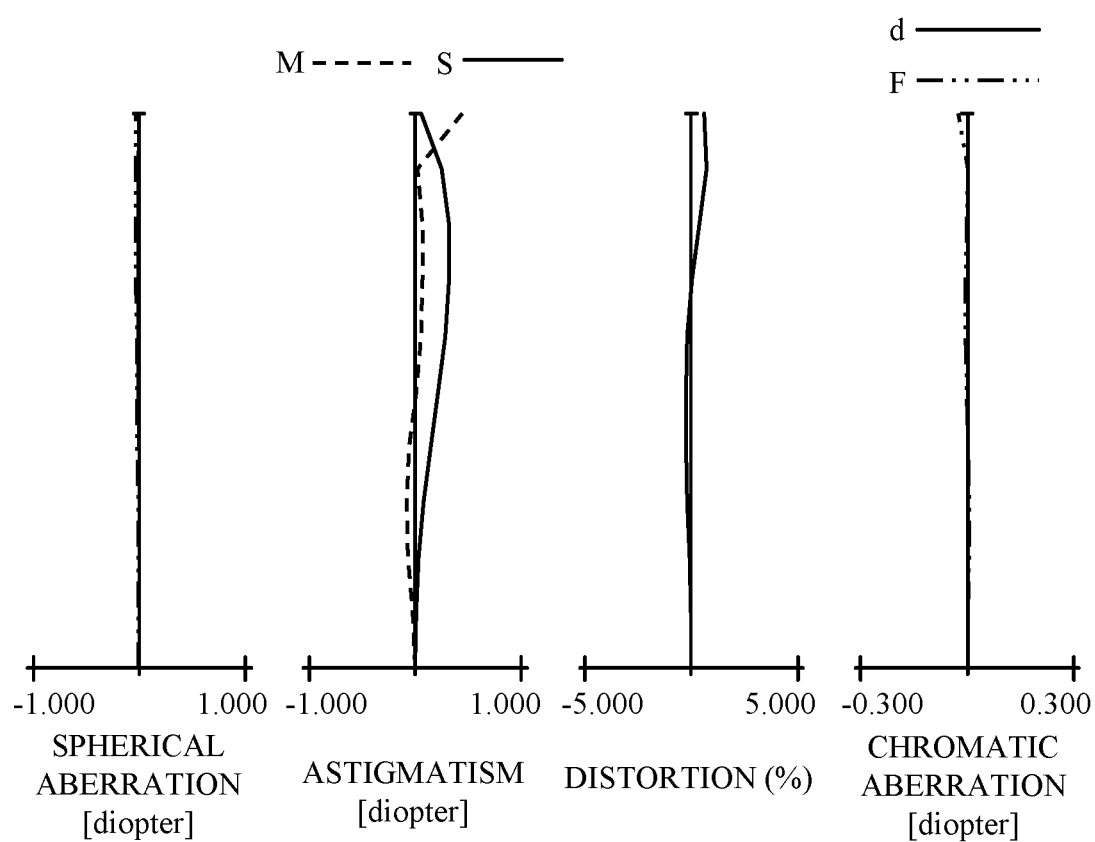
FIG. 14 is an aberration diagram of the display optical system according to Example 7.
Figure 15:
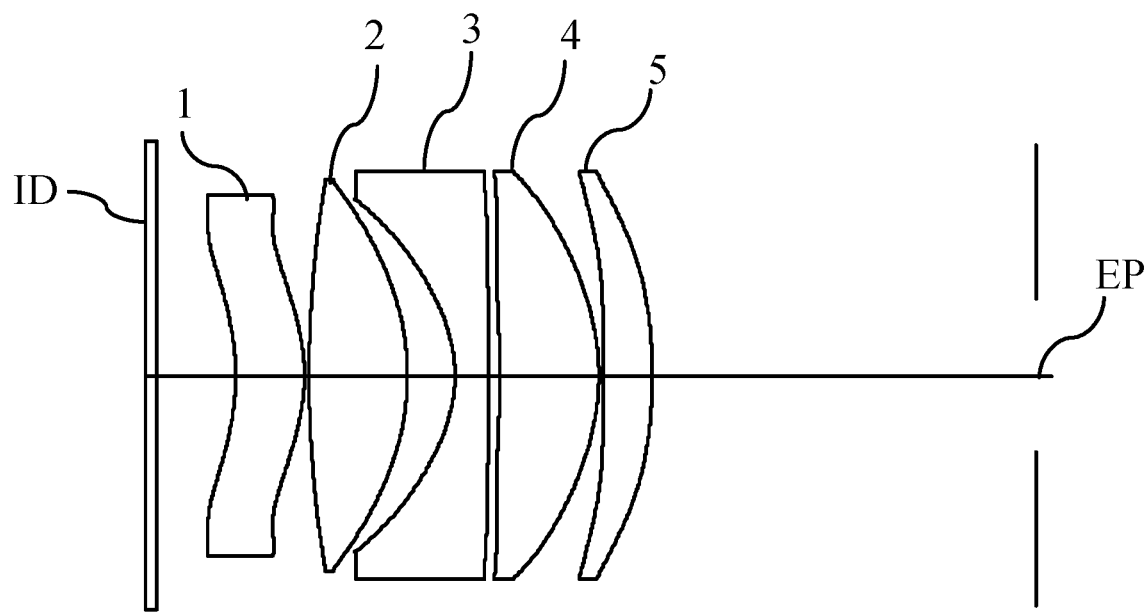
FIG. 15 is a sectional view of a display optical system according to Example 8.
Figure 16:
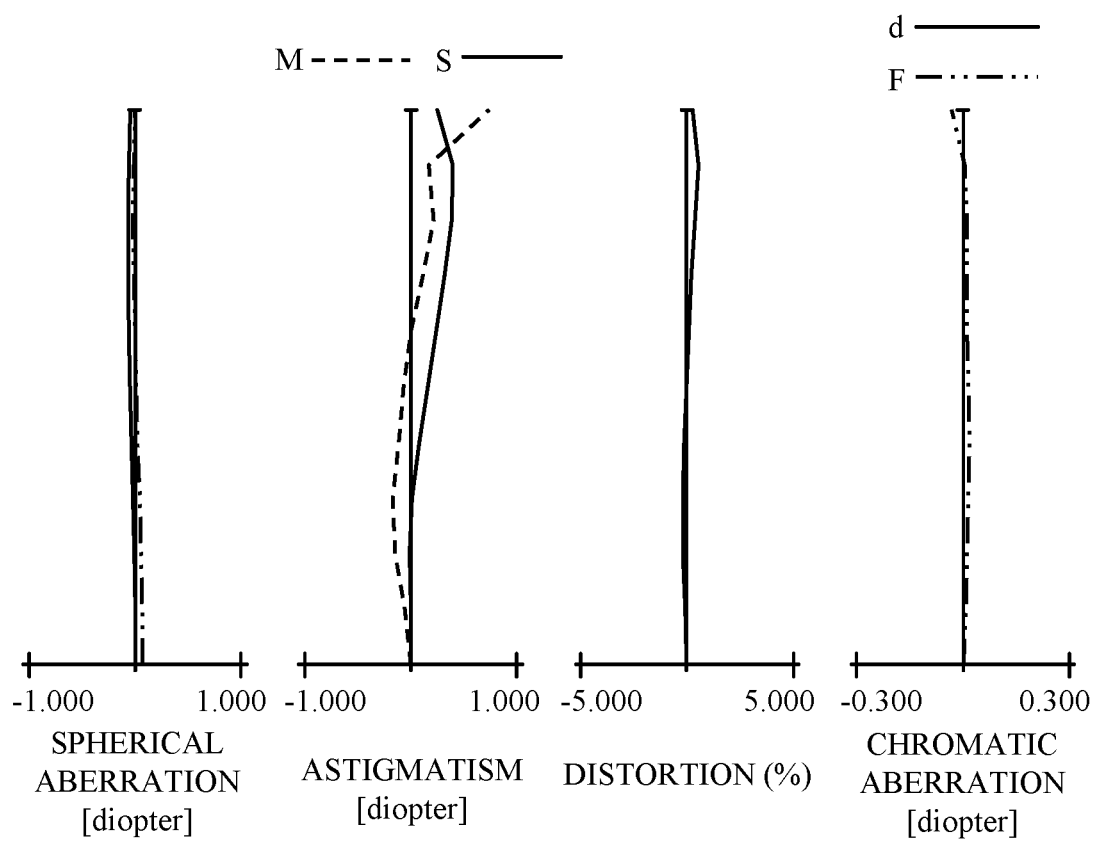
FIG. 16 is an aberration diagram of the display optical system according to Example 8.
Figure 17:
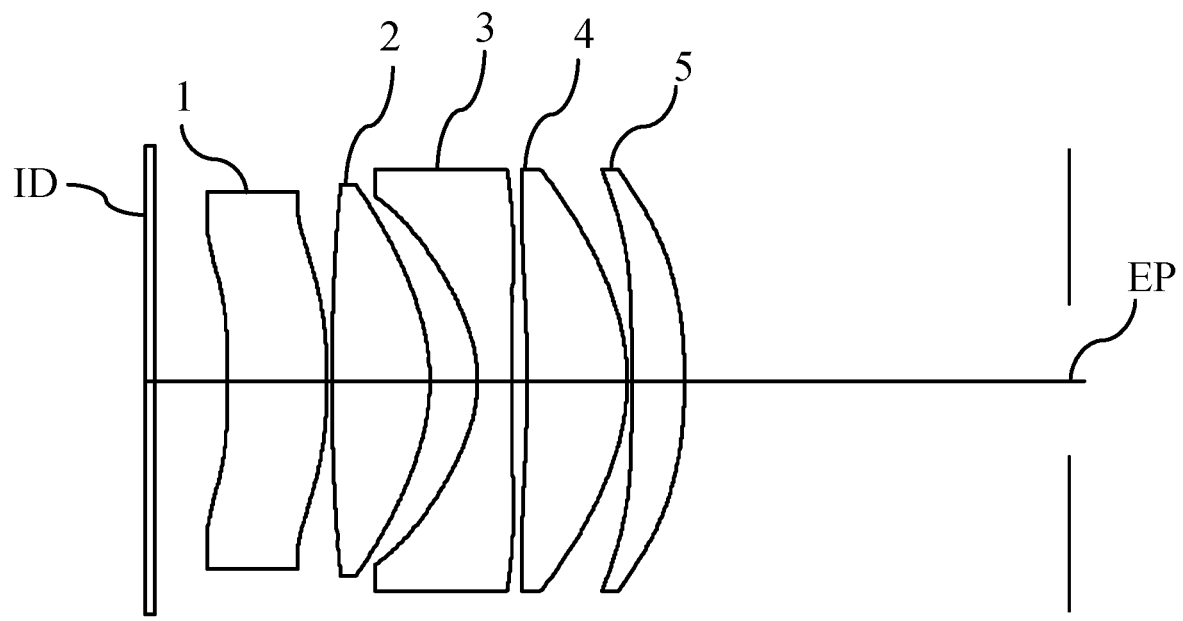
FIG. 17 is a sectional view of a display optical system according to Example 9.
Figure 18:
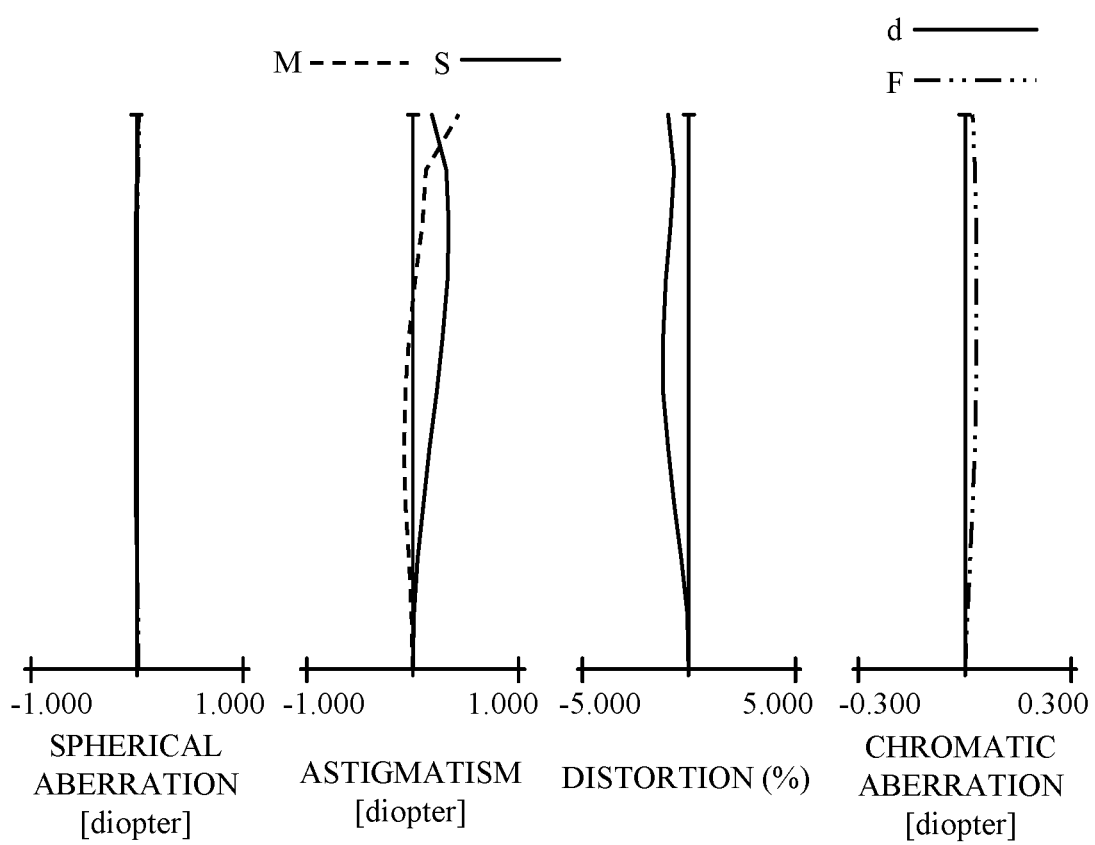
FIG. 18 is an aberration diagram of the display optical system according to Example 9.
Figure 19:
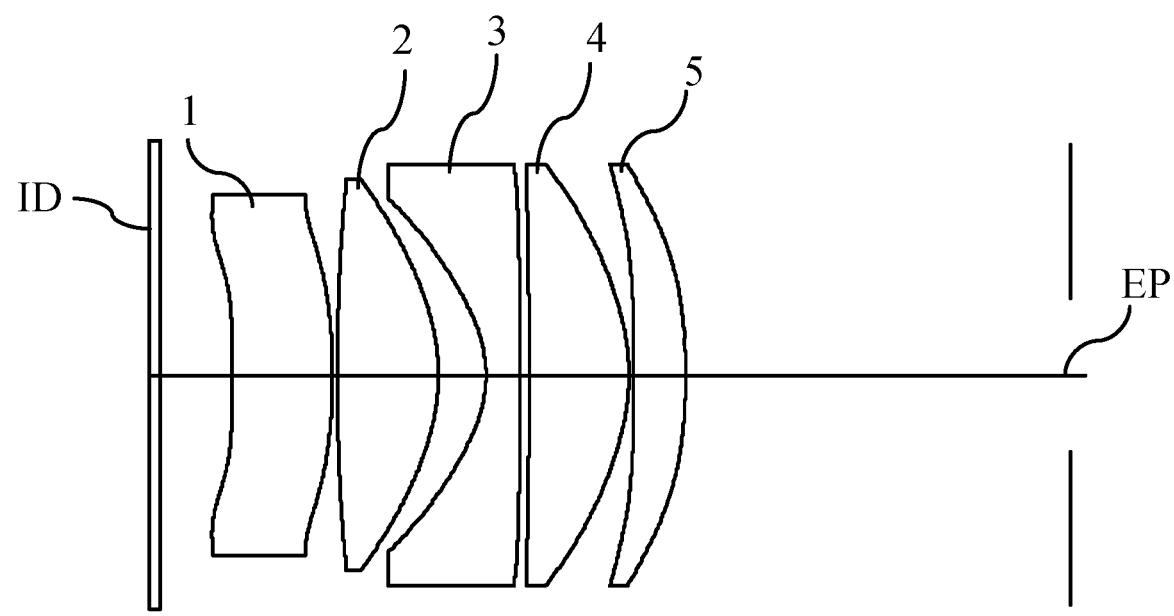
FIG. 19 is a sectional view of a display optical system according to Example 10.
Figure 20:
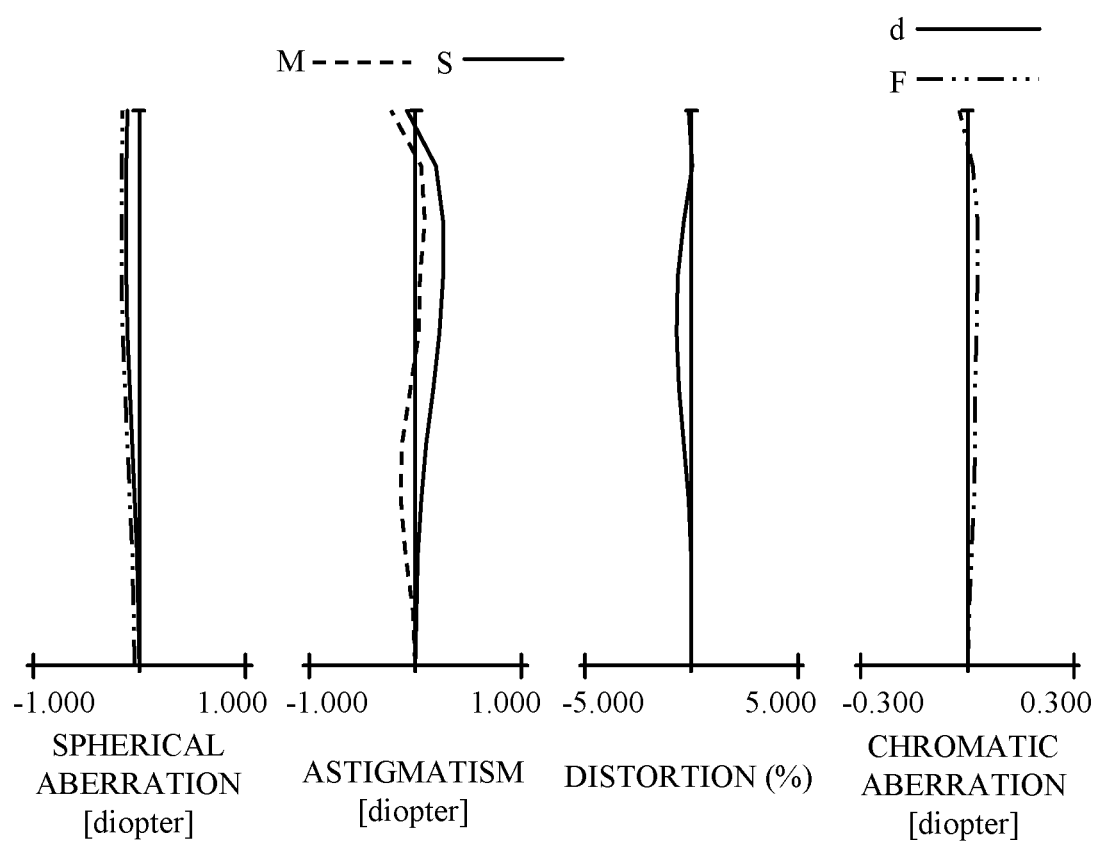
FIG. 20 is an aberration diagram of the display optical system according to Example 10.
Figure 21:
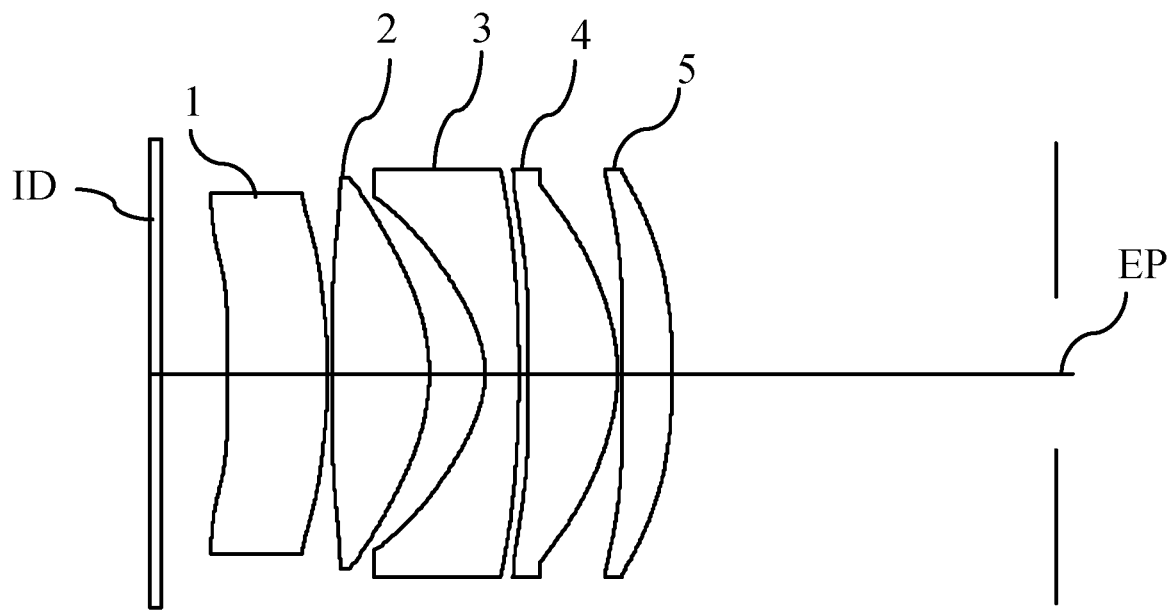
FIG. 21 is a sectional view of a display optical system according to Example 11.
Figure 22:
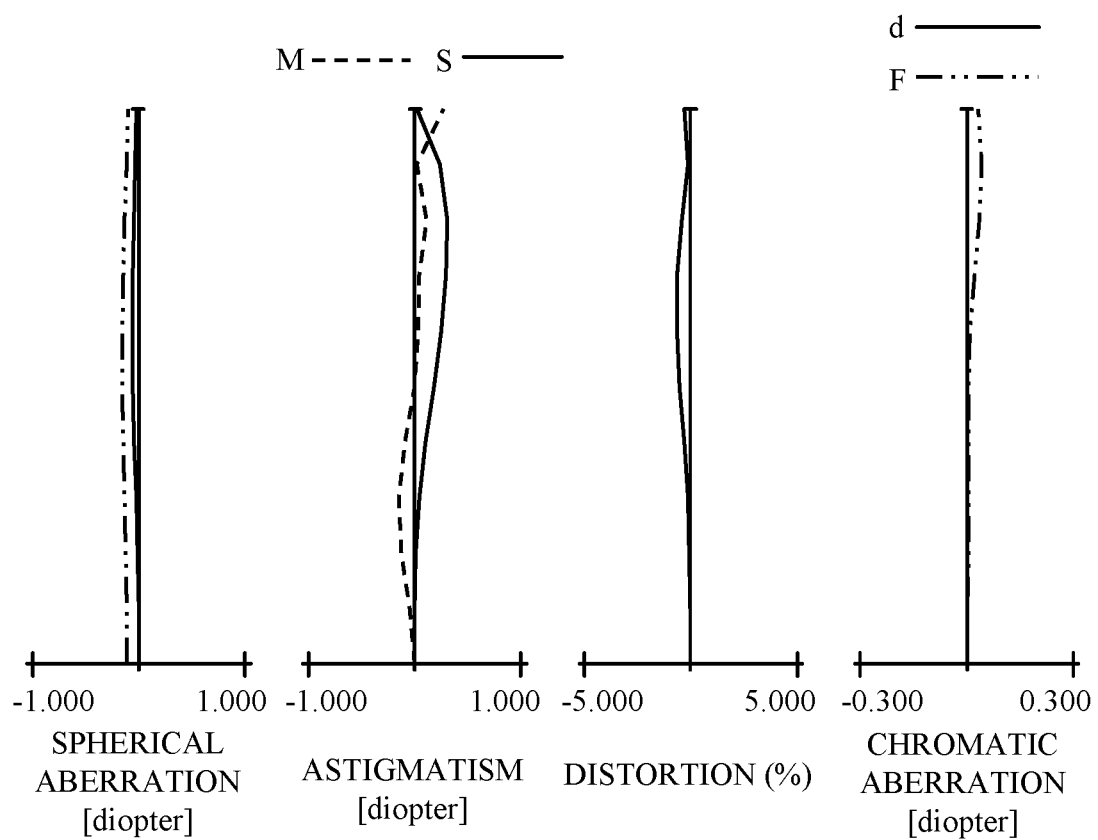
FIG. 22 is an aberration diagram of the display optical system according to Example 11.
Figure 23:
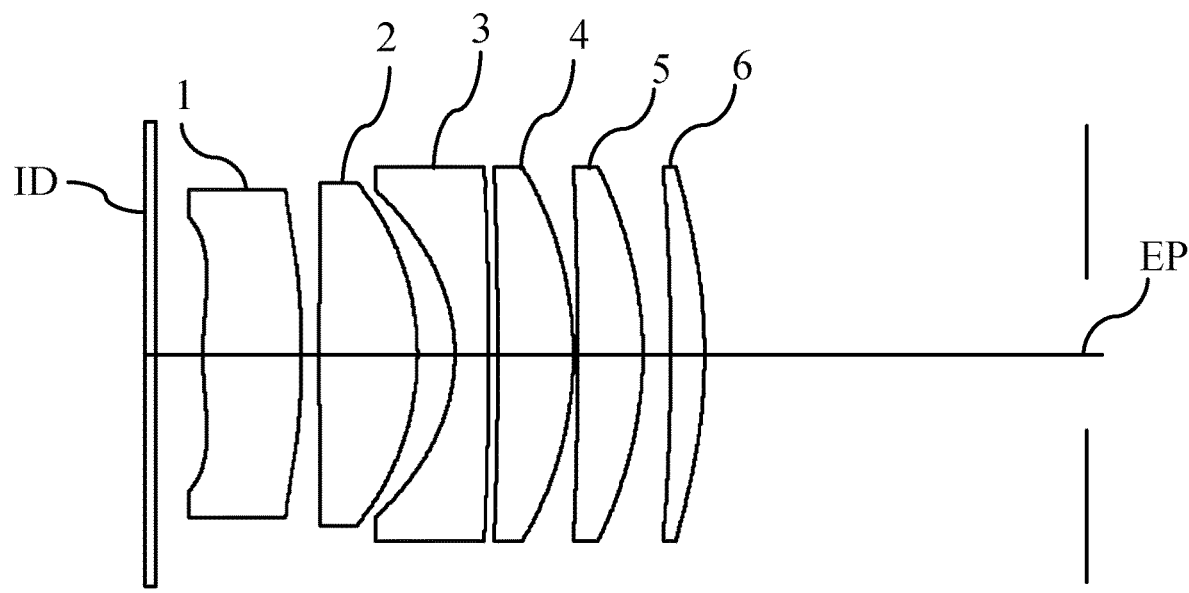
FIG. 23 is a sectional view of a display optical system according to Example 12.
Figure 24:
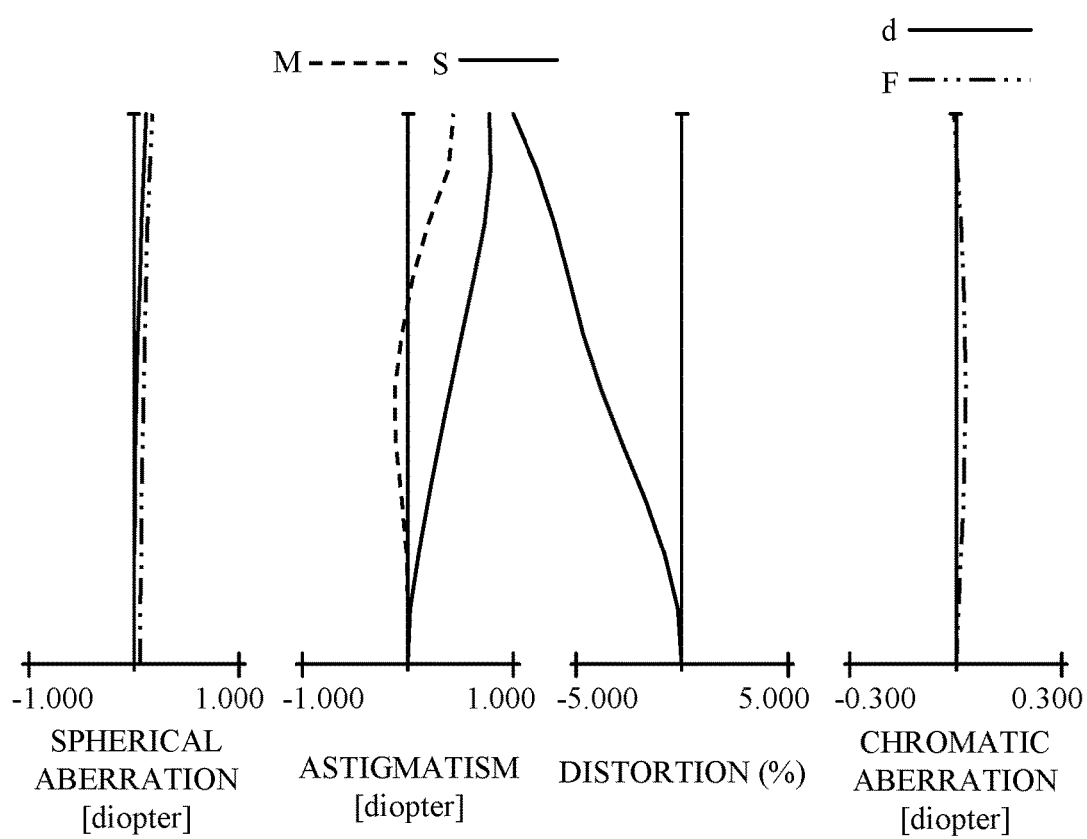
FIG. 24 is an aberration diagram of the display optical system according to Example 12.

Referring now to the accompanying drawings, a description will be given of examples according to the disclosure.

FIGS. 1, 3, 5, 7, 9, 11, 13, 15, 17, 19, 21, and 23 illustrate configurations of display optical systems (finder optical systems) according to Examples 1 to 12, respectively, at a diopter of −1.0 diopter (standard diopter). Here, prior to a detailed description according to Examples 1 to 12, matters common to each example will be described.

The display optical system according to each example guides light from a display element (or element) ID to an observation side eyepoint (observation plane (surface) or exit pupil) EP. In each example, a small display element with a diagonal length of about 20 mm or less is used as the display element ID, and each example enables an image displayed on the display element ID to be observed in a wide field with a viewing angle of 30° or more. Each display optical system is used as an optical system for an EVF in a variety of image pickup apparatuses such as digital still cameras, video cameras, and broadcasting cameras, and as an optical system for a display apparatus such as an HMD. The display optical system according to each example can adjust the diopter (or eyesight) by moving the entire display optical system relative to the display element ID or by moving the display element ID itself.

In order to enable an image displayed on a small display element ID described above to be observed in a wide field, the display optical system as a whole is to have strong positive refractive power, and each lens is to have strong positive or negative refractive power for this purpose. In addition, in order to secure sufficient eye relief, the F-number of the display optical system is to be decreased, and for this purpose, a wide effective light range of the eyepiece lens is secured. As a result, it becomes difficult to correct spherical aberration, curvature of field, astigmatism, and chromatic aberration, and the optical performance may deteriorate particularly at the peripheral image height on the object side.

Accordingly, the display optical system according to each example includes, in order from the object side (display element side) to the observation side, a first lens 1 having positive refractive power, a second lens 2 having positive refractive power, a third lens 3 having negative refractive power, a fourth lens 4 having positive refractive power, and a fifth lens 5 having positive refractive power. The display optical system according to Example 12 further includes a sixth lens 6 having positive refractive power. Each lens is a single lens that is not cemented with another lens. By setting proper refractive power to each lens, a display optical system with high magnification, sufficiently long eye relief, and high optical performance can be realized.

The display optical system according to each example satisfies the following inequalities (1) and (2):

$$1.700 \le nd2 \tag{1}$$

$$0.000 < f2/f1 \le 0.790 \tag{2}$$

In inequalities (1) and (2), nd2 is a refractive index of the second lens 2 for the d-line, f1 is a focal length of the first lens 1, and f2 is a focal length of the second lens 2.

Inequality (1) relates to a refractive index nd2 of the second lens 2. In order to ensure high magnification and long eye relief while a variety of aberrations such as spherical aberration, curvature of field, and astigmatism are satisfactorily corrected, a high refractive material for a lens material is used. However, the high refractive material is generally expensive, and it is not realistic to use the high refractive material for all lenses, and a display optical system is constructed by using the high refractive material for the minimum number of lenses.

In a display optical system that enlarges and enables an image displayed on a small display element to be observed, the effective light range of the lens generally expands as a distance from the display element increases, and thus each lens diameter tends to increase. As the lens diameter increases, the lens volume exponentially increases, so the amount of high refractive material to be used also increases and/or it becomes difficult to mold the lens.

Using a high refractive material for the second lens 2 rather than using it for the first lens 1 can more effectively correct a variety of aberrations. Using a high refractive material for the second lens 2 can satisfactorily correct a variety of aberrations and realize a display optical system with high magnification and long eye relief. In a case where nd2 is lower than the lower limit of inequality (1), the curvature of the second lens 2 increases, and it becomes difficult to correct the variety of aberrations such as spherical aberration, curvature of field, and astigmatism.

Inequality (2) relates to a relationship between the focal length f1 of the first lens 1 and the focal length f2 of the second lens 2 so as to achieve both high magnification and corrections of curvature of field, astigmatism and distortion. In a case where f2/f1 is higher than the upper limit of inequality (2), the corrections of curvature of field, astigmatism, and distortion will become insufficient due to the weak power of the second lens 2. In a case where f2/f1 is lower than the lower limit of inequality (2), the high magnification scheme becomes difficult due to the weak power of the first lens 1.

Inequalities (1) and (2) may be replaced with the following inequalities (1a) and (2a):

$$1.700 \le nd2 \le 1.900 \tag{1a}$$

$$0.075 \le f2/f1 \le 0.790 \tag{2a}$$

Inequalities (1) and (2) may be replaced with the following inequalities (1b) and (2b):

$$1.720 \le nd2 \le 1.855 \tag{1b}$$

$$0.080 \le f2/f1 \le 0.790 \tag{2b}$$

As described above, each lens may be a single lens. The display optical system may include a minimum number of lenses in order to avoid its size from becoming large. Hence, the surface shape of each lens is set to a proper value for satisfactory corrections of spherical and lateral aberrations.

The display optical system according to each example may satisfy at least one of the following inequalities (3) to (12):

$$-2.00 \le f2/f3 < -0.80 \tag{3}$$

$$-2.00 \le f3/f \le -0.40 \tag{4}$$

$$0.50 \le f2/f \le 2.00 \tag{5}$$

$$0.80 \le f4/f \le 5.00 \tag{6}$$

$$1.50 \le f5/f \le 5.00 \tag{7}$$

$$-1.00 \le (R22+R21)/(R22-R21) < 0.00 \tag{8}$$

$$0.50 \le (R32+R31)/(R32-R31) < 3.00 \tag{9}$$

$$1.10 \le TL/f \le 1.90 \tag{10}$$

$$0.10 \le db/f \le 0.50 \tag{11}$$

$$0.32 \le H/f \le 0.50 \tag{12}$$

In inequality (3) to (12), f3 is a focal length of the third lens 3, f4 is a focal length of the fourth lens 4, and f5 is a focal length of the fifth lens 5. R21 is a radius of curvature of the object-side lens surface of the second lens 2, R22 is a radius of curvature of the observation-side lens surface of the second lens 2, R31 is a radius of curvature of the object-side lens surface of the third lens 3, and R32 is a radius of curvature on the observation side lens surface of the third lens 3. TL is a distance on the optical axis from a lens surface closest to the object of the display optical system (the object-side lens surface of the first lens 1) to a lens surface closest to the observation plane (surface) of the display optical system. Db is a distance on the optical axis from the display plane of the display element ID as the object surface to a lens surface closest to the object of the display optical system, and H is a half diagonal length of the display plane of the display element ID.

Inequality (3) relates to a relationship between the focal length f2 of the second lens 2 and the focal length f3 of the third lens 3 so as to satisfactorily correct aberrations, such as curvature of field, astigmatism, and lateral aberration, and to realize high magnification and long eye relief. In a case where f2/f3 is higher than the upper limit of inequality (3), the negative power of the third lens 3 becomes weaker, the Petzval sum of the display optical system increases, and it becomes difficult to correct the aberrations, such as curvature of field and astigmatism. In a case where f2/f3 is lower than the lower limit of inequality (3), the power of the second lens 2 becomes insufficient, and it becomes difficult to correct lateral aberration.

Inequality (4) relates to a relationship between the focal length f3 of the third lens 3 and the focal length f of the entire display optical system so as to satisfactorily correct aberrations, such as curvature of field and astigmatism, and to achieve high magnification and long eye relief. In a case where f3/f is higher than the upper limit of inequality (4), the negative power of the third lens 3 becomes weak, the Petzval sum of the display optical system increases, and it becomes difficult to correct aberrations such as curvature of field and astigmatism. In a case where f3/f is lower than the lower limit of inequality (4), the power of the third lens 3 becomes too strong, the positive power of the display optical system as a whole becomes insufficient, and it becomes difficult to achieve high magnification.

Inequality (5) relates to a relationship between the focal length f2 of the second lens 2 and the focal length f of the entire display optical system so as to achieve both high magnification and corrections of aberrations such as curvature of field, astigmatism, and lateral aberration. In a case where f2/f is higher than the upper limit of inequality (5), the positive power of the display optical system as a whole will be insufficient, and it becomes difficult to achieve high magnification. In a case where f2/f is lower than the lower limit of inequality (5), the power of the second lens 2 becomes too strong and aberrations such as curvature of field, astigmatism, and lateral aberration increase.

Inequality (6) relates to a relationship between the focal length f4 of the fourth lens 4 and the focal length f of the entire display optical system so as to achieve both the sensitivity of the display optical system and corrections of aberrations such as curvature of field and astigmatism. In a case where f4/f is higher than the upper limit of inequality (6), the sensitivity of the display optical system increases and the manufacturing difficulty increases. In a case where f4/f is lower than the lower limit of inequality (6), aberrations such as curvature of field and astigmatism increase.

Inequality (7) relates to a relationship between the focal length f5 of the fifth lens 5 and the focal length f of the entire display optical system so as to achieve both the sensitivity of the display optical system and correction of lateral aberration. In a case where f5/f is higher than the upper limit of inequality (7), correction of lateral aberration becomes insufficient. In a case where f5/f is lower than the lower limit of inequality (7), the sensitivity of the display optical system becomes too high.

Inequality (8) relates to a shape of the lens surface of the second lens 2 so as to achieve both high magnification of the display optical system and corrections of aberrations such as curvature of field and astigmatism. In a case where (R22+R21)/(R22−R21) is higher than the upper limit of inequality (8), corrections of aberrations such as curvature of field and astigmatism become difficult. In a case where (R22+R21)/(R22−R21) is lower than the lower limit of inequality (8), it is difficult to achieve high magnification of the display optical system.

Inequality (9) relates to a shape of the lens surface of the third lens 3 so as to achieve both high magnification of the display optical system and corrections of aberrations such as curvature of field, astigmatism, and distortion. In a case where (R32+R31)/(R32−R31) is higher than the upper limit of inequality (9), corrections of aberrations such as curvature of field and astigmatism become difficult. In a case where (R32+R31)/(R32−R31) is lower than the lower limit of inequality (9), correction of distortion becomes difficult.

Inequality (10) relates to a relationship between the thickness TL of the entire display optical system and the focal length f of the entire display optical system so as to achieve both high magnification of the display optical system and corrections of aberrations such as spherical aberration and lateral aberration. In a case where TL/f is higher than the upper limit of inequality (10), the thickness of the display optical system becomes too large and it becomes difficult to achieve high magnification. In a case where TL/f is lower than the lower limit of inequality (10), a proper curvature cannot be set to each lens, and it becomes difficult to correct aberrations such as spherical aberration and lateral aberration.

Inequality (11) relates to a relationship between the distance db from the object plane to a lens surface closest to the object at the standard diopter of the display optical system and the focal length f of the entire display optical system so as to control the manufacturing difficulty of the display optical system and to satisfactorily correct curvature of field and astigmatism. The diopter can be adjusted by moving the display optical system relative to the display plane of the display element ID so as to change the distance db. In a case where db/f is higher than the upper limit of inequality (11), db becomes too long to satisfactorily correct curvature of field and astigmatism. In a case where db/f is lower than the lower limit of inequality (11), the first lens 1 may come into contact with the display element ID in adjusting the diopter of the display optical system or dropping the image pickup apparatus or the display apparatus.

Inequality (12) relates to a relationship between the half diagonal length H of the display plane of the display element ID and the focal length f of the display optical system so as to achieve both a wide viewing angle and corrections of a variety of aberrations such as spherical aberration, curvature of field, and astigmatism. In a case where H/f is higher than the upper limit of inequality (12), the magnification of the display optical system becomes excessively large, and it becomes difficult to correct aberrations such as spherical aberration, curvature of field, and astigmatism. In a case where H/f is lower than the lower limit of inequality (12), it becomes difficult to achieve a wide viewing angle.

Inequalities (3) to (12) may be replaced with the following inequalities (3a) to (12a):

$$-1.70 \leq f2/f3 < -0.90 \quad (3a)$$

$$-1.50 \leq f3/f \leq -0.45 \quad (4a)$$

$$0.60 \leq f2/f \leq 1.50 \quad (5a)$$

$$0.80 \leq f4/f \leq 3.00 \quad (6a)$$

$$1.80 \leq f5/f \leq 4.00 \quad (7a)$$

$$-1.50 \leq (R22+R21)/(R22-R21) \leq -0.45 \quad (8a)$$

$$0.70 \leq (R32+R31)/(R32-R31) \leq 2.50 \quad (9a)$$

$$1.20 \leq TL/f \leq 1.80 \quad (10a)$$

$$0.15 \leq db/f \leq 0.40 \quad (11a)$$

$$0.34 \leq H/f \leq 0.50 \quad (12a)$$

Inequalities (3) to (12) may be replaced with the following inequalities (3b) to (12b):

$$-1.60 \leq f2/f3 < -1.00 \quad (3b)$$

$$-1.20 \leq f3/f \leq -0.50 \quad (4b)$$

$$0.70 \leq f2/f \leq 1.30 \quad (5b)$$

$$0.90 \leq f4/f \leq 2.70 \quad (6b)$$

$$2.00 \leq f5/f \leq 3.50 \quad (7b)$$

$$-1.20 \leq (R22+R21)/(R22-R21) \leq -0.50 \quad (8b)$$

$$0.80 \leq (R32+R31)/(R32-R31) \leq 1.90 \quad (9b)$$

$$1.25 \leq TL/f \leq 1.70 \quad (10b)$$

$$0.15 \leq db/f \leq 0.35 \quad (11b)$$

$$0.34 \leq H/f \leq 0.45 \quad (12b)$$

The second lens 2 may be a biconvex lens. Since the second lens 2 is the lens that requires the strongest power in the display optical system, the second lens 2 that is the biconvex lens can distribute its power on both sides and reduce the sensitivity.

The third lens 3 may be a meniscus lens with a concave surface facing the object side. This is because in a case where the third lens 3 has a concave surface on the observation side, a difference in thickness between the central portion and the peripheral portion of the third lens 3 becomes too large, and the manufacture of the third lens 3 becomes difficult.

The fifth lens 5 may be a meniscus lens with a convex surface facing the observation side, because sensitivity can be lowered by setting the meniscus lens to the fifth lens 5. In a case where the fifth lens 5 is a biconvex lens, the sensitivity increases and the manufacturing difficulty of the display optical system increases.

The curved surface shape of the object-side lens surface of the first lens 1 may have an inflection point (inflection curve), which is a point at which a convex shape and a concave shape are switched, that is, a sign of a curvature changes. This is because the display optical system has a relatively strong positive power at an image height near the center, but a variety of aberrations such as curvature of field can be satisfactorily corrected with a small power at an image height in the peripheral portion.

A detailed description according to Examples 1 to 12 will now be given. Tables 1 to 12 illustrate numerical examples 1 to 12 corresponding to Examples 1 to 12.

In each numerical example, a focal length f (mm) denotes a focal length of the entire display optical system, and a display diagonal length (mm) denotes a diagonal length (2H) of the display plane or surface of the display element ID. ω denotes a half angle of view (°) of the display optical system, and 2ω denotes a full angle of view (viewing angle) (°). A surface number i denotes the order of surfaces counted from the object side. A first surface is the display plane of the display element ID, and a second surface is a surface on the observation side of the cover glass of the display element ID. r denotes a radius of curvature of each surface (mm), d denotes a lens thickness or distance (air gap) (mm) on the optical axis between an i-th surface and an (i+1)-th surface. nd denotes a refractive index of a material of an optical element having each surface for the d-line. vd is an Abbe number of the material of the optical element having each surface based on the d-line. The Abbe number vd is expressed as follows:

$$vd=(Nd-1)/(NF-NC)$$

where Nd, NF, and NC are refractive indexes based on the d-line (587.6 nm), F-line (486.1 nm), and C-line (656.3 nm) in the Fraunhofer line, respectively.

An asterisk * attached to the surface number means that the surface has an aspherical shape. The aspherical shape is expressed as follows:

$$x=(h^2/R)/[1+\{1-(1\pm K)(h/r)^2\}^{1/2}]+A4 \times h^4 \pm A6 \times h^6 + A8 \times h^8 + A10 \times h^{10} + A12 \times h^{12}$$

where x is a displacement amount from a surface vertex in the optical axis direction, h is a height from the optical axis in a direction orthogonal to the optical axis, a light traveling direction is set positive, r is a paraxial radius of curvature, K is a conical constant, A4, A6, A8, A10, and A12 are aspherical coefficients. "E±M" for conical constants and aspherical coefficients means×$10^{\pm m}$.

Each numerical example illustrates a diopter to be adjusted and a focal length of each lens by moving the entire display optical system relative to the display element ID or by moving the display element ID itself to change a distance between the second surface and the third surface (the object-side lens surface of the first lens 1).

Table 13 summarizes values of inequalities (1) to (12) in numerical examples 1 to 12.

FIGS. 2, 4, 6, 8, 10, 12, 14, 16, 18, 20, 22, and 24 illustrate longitudinal aberrations (spherical aberration, astigmatism, distortion, and chromatic aberration) of the display optical systems according to numerical examples 1 to 12, respectively, at the standard diopter. In the spherical aberration diagram, a solid line indicates a spherical aberration amount for the d-line, and an alternate long and two short dashes line indicates a spherical aberration amount for the F-line. In the astigmatism diagram, a solid line S indicates an astigmatism amount on a sagittal image plane, and a dashed line M indicates an astigmatism amount on the meridional image plane. The distortion diagram illustrates a distortion amount for the d-line. The chromatic aberration diagram illustrates a lateral chromatic aberration amount for the F-line.

TABLE 1

NUMERICAL EXAMPLE 1

UNIT: mm
Surface Data

|  |  | Surface No | r | d | nd | vd |
|---|---|---|---|---|---|---|
| Focal Length f | 20.37 | 1 | ∞ | 0.7 | 1.52100 | 65.12 |
| Display Diagonal Length 2H | 16.4 | 2 | ∞ | (variable) | | |
| 2ω [deg] | 43.4 | 3* | −16.5374 | 4.5989 | 1.53500 | 55.73 |
|  |  | 4* | −12.8300 | 0.3000 | | |
|  |  | 5* | 75.0000 | 6.4000 | 1.76802 | 49.24 |
|  |  | 6* | −16.9577 | 3.1307 | | |
|  |  | 7* | −9.8844 | 2.2000 | 1.63550 | 23.89 |
|  |  | 8* | −238.6904 | 0.8304 | | |
|  |  | 9* | −36.0771 | 6.5000 | 1.53500 | 55.73 |
|  |  | 10* | −13.8581 | 0.3000 | | |
|  |  | 11* | −5000 | 3.0189 | 1.76802 | 49.24 |
|  |  | 12* | −40.70098 | 25.0000 | | |
|  |  | EP | Observation Surface | | | |

Aspheric Data

|  | 3rd Surface | 4th Surface | 5th Surface | 6th Surface | 7th Surface |
|---|---|---|---|---|---|
| K | 0.0000E+00 | 0.0000E+00 | 0.0000E+00 | 4.1632E−01 | −4.2047E−01 |
| A4 | 1.6255E−04 | 2.9380E−04 | 0.0000E+00 | −2.4800E−05 | 1.3033E−04 |
| A6 | −3.9953E−06 | −2.1388E−06 | 0.0000E+00 | 1.4784E−06 | 7.1699E−07 |
| A8 | 8.0123E−08 | 2.0108E−08 | 0.0000E+00 | −1.2065E−08 | −9.4556E−09 |
| A10 | −4.6480E−10 | 8.8527E−11 | 0.0000E+00 | 3.9822E−11 | 4.0473E−11 |
| A12 | 6.5285E−13 | −7.3391E−13 | 0.0000E+00 | 0.0000E+00 | 0.0000E+00 |

|  | 8th Surface | 9th Surface | 10th Surface | 11th Surface | 12th Surface |
|---|---|---|---|---|---|
| K | 0.0000E+00 | 0.0000E+00 | −1.3497E−01 | 0.0000E+00 | 2.6238E−01 |
| A4 | 4.4826E−05 | 2.6291E−04 | 1.2223E−04 | −1.1597E−04 | −1.1241E−04 |
| A6 | −3.6299E−07 | −2.1049E−06 | −2.1517E−07 | 1.3880E−07 | 4.3361E−07 |
| A8 | −3.7443E−10 | 5.3700E−09 | −1.9690E−09 | 1.7953E−09 | −1.0191E−09 |
| A10 | 1.0412E−11 | 1.5542E−11 | 1.9993E−11 | −4.9552E−12 | 3.4455E−12 |
| A12 | −2.7155E−14 | −8.1213E−14 | −3.8506E−14 | −1.4248E−16 | −3.5396E−15 |

| Variable Distance | | | | Focal Length of Each Lens | |
|---|---|---|---|---|---|
| Diopter [dptr] | −1.0 | −4.3 | 2.3 | f1 | 74.6821 |
| d2 | 5.0932 | 3.6283 | 6.4498 | f2 | 18.5695 |
| | | | | f3 | −16.2863 |
| | | | | f4 | 38.1670 |
| | | | | f5 | 53.4155 |

TABLE 2

NUMERICAL EXAMPLE 2

UNIT: mm
Surface Data

|  |  | Surface No | r | d | nd | vd |
|---|---|---|---|---|---|---|
| Focal Length f | 20.35 | 1 | ∞ | 0.7 | 1.52100 | 65.12 |
| Display Diagonal Length 2H | 16.4 | 2 | ∞ | (variable) | | |
| 2ω [deg] | 43.2 | 3* | −21.4116 | 4.3502 | 1.53500 | 55.73 |
|  |  | 4* | −12.2794 | 0.3000 | | |
|  |  | 5* | 253.7432 | 6.3980 | 1.76802 | 49.24 |
|  |  | 6* | −16.1168 | 3.1271 | | |
|  |  | 7* | −9.2687 | 2.2000 | 1.63550 | 23.89 |
|  |  | 8* | −178.1013 | 0.6943 | | |
|  |  | 9* | −49.9244 | 6.5000 | 1.53500 | 55.73 |
|  |  | 10* | −15.1192 | 0.3000 | | |
|  |  | 11* | −799.7004 | 2.9480 | 1.76802 | 49.24 |
|  |  | 12* | −36.47535 | 25.0000 | | |
|  |  | EP | Observation Surface | | | |

TABLE 2-continued

NUMERICAL EXAMPLE 2

Aspheric Data

|  | 3rd Surface | 4th Surface | 5th Surface | 6th Surface | 7th Surface |
|---|---|---|---|---|---|
| K | 0.0000E+00 | 0.0000E+00 | −4.3761E+03 | 4.0087E−01 | −4.9383E−01 |
| A4 | 1.1026E−05 | 2.8829E−04 | 8.5694E−05 | −1.4350E−05 | 1.8529E−04 |
| A6 | −4.7434E−06 | −1.6986E−06 | −5.2280E−07 | 1.5478E−06 | 2.6856E−07 |
| A8 | 7.8580E−08 | 6.1042E−09 | 1.5154E−09 | −1.1483E−08 | −7.6943E−09 |
| A10 | −2.6084E−10 | 1.3615E−10 | −3.9223E−12 | 3.4617E−11 | 4.1590E−11 |
| A12 | −3.3095E−13 | −5.9818E−13 | −2.3220E−15 | 8.6243E−15 | 0.0000E+00 |

|  | 8th Surface | 9th Surface | 10th Surface | 11th Surface | 12th Surface |
|---|---|---|---|---|---|
| K | 0.0000E+00 | 0.0000E+00 | 2.5813E−02 | 0.0000E+00 | −9.3079E−02 |
| A4 | 3.5753E−05 | 2.1476E−04 | 9.0329E−05 | −1.5856E−04 | −1.2274E−04 |
| A6 | −2.9810E−07 | −2.0268E−06 | −8.8001E−08 | 4.8881E−07 | 5.4576E−07 |
| A8 | 9.8138E−10 | 6.6409E−09 | −3.4411E−09 | 2.3721E−09 | −5.6750E−10 |
| A10 | −3.3332E−12 | 8.3988E−12 | 3.0144E−11 | −1.6234E−11 | −2.3265E−14 |
| A12 | 9.3213E−15 | −7.0648E−14 | −6.4079E−14 | 1.5164E−14 | −9.6670E−15 |

| | Variable Distance | | | Focal Length of Each Lens | |
|---|---|---|---|---|---|
| Diopter [dptr] | −1.0 | −4.4 | 2.4 | f1 | 46.1516 |
| d2 | 5.5787 | 4.0621 | 6.9622 | f2 | 19.9369 |
| | | | | f3 | −15.4637 |
| | | | | f4 | 38.0591 |
| | | | | f5 | 49.6791 |

TABLE 3

NUMERICAL EXAMPLE 3

UNIT: mm
Surface Data

|  |  | Surface No | r | d | nd | vd |
|---|---|---|---|---|---|---|
| Focal Length f | 20.22 | 1 | ∞ | 0.7 | 1.52100 | 65.12 |
| Display Diagonal | 16.4 | 2 | ∞ | (variable) | | |
| Length 2H | | 3* | −48.7094 | 5.7247 | 1.53500 | 55.73 |
| 2ω [deg] | 43.1 | 4* | −12.3729 | 0.3000 | | |
| | | 5* | 5374.5980 | 6.2704 | 1.76802 | 49.24 |
| | | 6* | −17.2292 | 3.1732 | | |
| | | 7* | −9.2756 | 2.2000 | 1.63550 | 23.89 |
| | | 8* | −205.9351 | 0.7220 | | |
| | | 9* | −49.0318 | 6.5000 | 1.53500 | 55.73 |
| | | 10* | −15.1175 | 1.3152 | | |
| | | 11* | −799.9591 | 2.8339 | 1.76802 | 49.24 |
| | | 12* | −37.77783 | 25.0000 | | |
| | | EP | Observation Surface | | | |

Aspheric Data

|  | 3rd Surface | 4th Surface | 5th Surface | 6th Surface | 7th Surface |
|---|---|---|---|---|---|
| K | 0.0000E+00 | 0.0000E+00 | −2.5938E+04 | 4.1728E−01 | −5.0747E−01 |
| A4 | −6.7530E−05 | 2.8677E−04 | 9.3530E−05 | −1.9386E−05 | 1.9205E−04 |
| A6 | −4.6021E−06 | −1.7441E−06 | −5.2231E−07 | 1.5114E−06 | 3.3384E−07 |
| A8 | 8.0643E−08 | 5.7379E−09 | 1.3382E−09 | −1.1541E−08 | −8.1931E−09 |
| A10 | −2.7014E−10 | 1.2367E−10 | −3.5973E−12 | 3.3833E−11 | 4.2766E−11 |
| A12 | −4.1239E−13 | −5.3087E−13 | 1.6970E−15 | 6.4912E−15 | 0.0000E+00 |

|  | 8th Surface | 9th Surface | 10th Surface | 11th Surface | 12th Surface |
|---|---|---|---|---|---|
| K | 0.0000E+00 | 0.0000E+00 | 2.0906E−02 | 0.0000E+00 | 2.3659E−01 |
| A4 | 3.4928E−05 | 2.1396E−04 | 9.1438E−05 | −1.6129E−04 | −1.2211E−04 |
| A6 | −2.7296E−07 | −2.0104E−06 | −6.0388E−08 | 4.8800E−07 | 5.3032E−07 |
| A8 | 6.0319E−10 | 6.4676E−09 | −3.5521E−09 | 2.5218E−09 | −3.9557E−10 |
| A10 | −1.0551E−12 | 9.7537E−12 | 3.0786E−11 | −1.7611E−11 | −9.7629E−13 |
| A12 | 3.9927E−15 | −7.4078E−14 | −6.5713E−14 | 1.8625E−14 | −7.3908E−15 |

TABLE 3-continued

NUMERICAL EXAMPLE 3

| | Variable Distance | | | Focal Length of Each Lens | |
|---|---|---|---|---|---|
| Diopter [dptr] | −1.0 | −4.4 | 2.5 | f1 | 29.3881 |
| d2 | 5.0169 | 3.5093 | 6.4134 | f2 | 22.3728 |
| | | | | f3 | −15.3508 |
| | | | | f4 | 38.2947 |
| | | | | f5 | 51.5434 |

TABLE 4

NUMERICAL EXAMPLE 4

UNIT: mm
Surface Data

| | | Surface No | r | d | nd | vd |
|---|---|---|---|---|---|---|
| Focal Length f | 20.30 | 1 | ∞ | 0.7 | 1.52100 | 65.12 |
| Display Diagonal | 16.4 | 2 | ∞ | (variable) | | |
| Length 2H | | 3* | 74.9429 | 6.5130 | 1.63540 | 23.89 |
| 2ω [deg] | 43.5 | 4* | 223.0104 | 0.3000 | | |
| | | 5* | 70.7393 | 8.1345 | 1.76802 | 49.24 |
| | | 6* | −13.0000 | 3.9717 | | |
| | | 7* | −6.2804 | 1.9902 | 1.63540 | 23.89 |
| | | 8* | −23.6462 | 0.3000 | | |
| | | 9* | −72.1372 | 4.9582 | 1.53500 | 55.73 |
| | | 10* | −12.0352 | 0.3000 | | |
| | | 11* | −134.8437 | 3.6655 | 1.76802 | 49.24 |
| | | 12* | −34.96431 | 25.0000 | | |
| | | EP | Observation Surface | | | |

Aspheric Data

| | 3rd Surface | 4th Surface | 5th Surface | 6th Surface | 7th Surface |
|---|---|---|---|---|---|
| K | 0.0000E+00 | 0.0000E+00 | 2.3496E+01 | −4.5913E+00 | −1.6738E+00 |
| A4 | −2.8483E−05 | 0.0000E+00 | 1.8479E−09 | −1.4711E−04 | 1.2695E−04 |
| A6 | −3.9554E−06 | 0.0000E+00 | 4.3767E−07 | 1.0952E−06 | −9.6905E−07 |
| A8 | 4.9532E−08 | 0.0000E+00 | −2.6600E−09 | −3.2748E−09 | −2.5336E−09 |
| A10 | −1.6446E−10 | 0.0000E+00 | 0.0000E+00 | −1.2089E−13 | 2.0299E−11 |
| A12 | 0.0000E+00 | 0.0000E+00 | 0.0000E+00 | 0.0000E+00 | 0.0000E+00 |

| | 8th Surface | 9th Surface | 10th Surface | 11th Surface | 12th Surface |
|---|---|---|---|---|---|
| K | 0.0000E+00 | 0.0000E+00 | −1.0567E+00 | 0.0000E+00 | 4.0444E+00 |
| A4 | 1.8984E−04 | 0.0000E+00 | 1.9533E−04 | 0.0000E+00 | −5.7651E−05 |
| A6 | −1.0779E−06 | 0.0000E+00 | −1.3936E−06 | 0.0000E+00 | 5.7166E−07 |
| A8 | 2.2779E−09 | 0.0000E+00 | 5.6856E−09 | 0.0000E+00 | −2.3253E−09 |
| A10 | 0.0000E+00 | 0.0000E+00 | −1.0610E−11 | 0.0000E+00 | 5.6732E−12 |
| A12 | 0.0000E+00 | 0.0000E+00 | 0.0000E+00 | 0.0000E+00 | 0.0000E+00 |

| | Variable Distance | | | Focal Length of Each Lens | |
|---|---|---|---|---|---|
| Diopter [dptr] | −1.0 | −4.3 | 2.3 | f1 | 174.6570 |
| d2 | 3.6369 | 2.1534 | 4.9780 | f2 | 14.9289 |
| | | | | f3 | −14.0858 |
| | | | | f4 | 26.2456 |
| | | | | f5 | 60.4976 |

TABLE 5

NUMERICAL EXAMPLE 5

UNIT: mm
Surface Data

| | | Surface No | r | d | nd | vd |
|---|---|---|---|---|---|---|
| Focal Length f | 20.34 | 1 | ∞ | 0.7 | 1.52100 | 65.12 |
| Display Diagonal | 16.4 | 2 | ∞ | (variable) | | |
| Length 2H | | 3* | −90.5205 | 6.5000 | 1.63550 | 23.89 |
| 2ω [deg] | 43.3 | 4* | −41.3163 | 0.3000 | | |

TABLE 5-continued

NUMERICAL EXAMPLE 5

| | | | | |
|---|---|---|---|---|
| 5* | 75.0000 | 6.8000 | 1.76802 | 49.24 |
| 6* | −13.5000 | 3.5606 | | |
| 7* | −6.4067 | 2.3288 | 1.63550 | 23.89 |
| 8* | −33.1333 | 0.2780 | | |
| 9* | −340.5535 | 6.4372 | 1.53500 | 55.73 |
| 10* | −16.2542 | 0.3000 | | |
| 11* | 77.76006 | 2.7958 | 1.76802 | 49.24 |
| 12* | −63.96055 | 25.0000 | | |
| EP | Observation Surface | | | |

Aspheric Data

| | 3rd Surface | 4th Surface | 5th Surface | 6th Surface | 7th Surface |
|---|---|---|---|---|---|
| K | 0.0000E+00 | −6.1381E+01 | 0.0000E+00 | −2.9563E+00 | −7.9007E−01 |
| A4 | 1.1694E−04 | 1.0833E−04 | 0.0000E+00 | −1.5395E−04 | 6.7172E−04 |
| A6 | −8.4534E−06 | −2.9569E−06 | 0.0000E+00 | 2.0519E−06 | −4.2179E−06 |
| A8 | 1.0352E−07 | 2.0507E−08 | 0.0000E+00 | −1.1990E−08 | 1.8033E−08 |
| A10 | −3.6027E−10 | −4.4958E−11 | 0.0000E+00 | 2.8576E−11 | −2.9936E−11 |
| A12 | 0.0000E+00 | 0.0000E+00 | 0.0000E+00 | 0.0000E+00 | 0.0000E+00 |

| | 8th Surface | 9th Surface | 10th Surface | 11th Surface | 12th Surface |
|---|---|---|---|---|---|
| K | 0.0000E+00 | 0.0000E+00 | −4.5710E+00 | 0.0000E+00 | 17727E+01 |
| A4 | 2.2129E−04 | 0.0000E+00 | −7.1967E−05 | −1.9276E−04 | −1.2376E−04 |
| A6 | −1.6369E−06 | 0.0000E+00 | 2.3846E−07 | 6.5844E−07 | 3.6135E−07 |
| A8 | 5.6457E−09 | 0.0000E+00 | −6.0412E−10 | 6.0617E−10 | 6.8111E−10 |
| A10 | −8.2407E−12 | 0.0000E+00 | −3.4289E−13 | −4.9016E−12 | −1.2520E−12 |
| A12 | 0.0000E+00 | 0.0000E+00 | 0.0000E+00 | 0.0000E+00 | 0.0000E+00 |

| Variable Distance | | | | Focal Length of Each Lens | |
|---|---|---|---|---|---|
| Diopter [dptr] | −1.0 | −4.3 | 2.3 | f1 | 113.7645 |
| d2 | 4.4482 | 2.9733 | 5.7964 | f2 | 15.4107 |
| | | | | f3 | −12.9359 |
| | | | | f4 | 31.6851 |
| | | | | f5 | 46.0894 |

TABLE 6

NUMERICAL EXAMPLE 6

UNIT: mm
Surface Data

| | | Surface No | r | d | nd | vd |
|---|---|---|---|---|---|---|
| Focal Length f | 20.27 | 1 | ∞ | 0.7 | 1.52100 | 65.12 |
| Display Diagonal Length 2H | 16.4 | 2 | ∞ | (variable) | | |
| | | 3* | −288.4086 | 6.5000 | 1.53500 | 55.73 |
| 2ω [deg] | 43.2 | 4* | −32.1501 | 0.3000 | | |
| | | 5* | 75.0000 | 6.4000 | 1.85135 | 40.10 |
| | | 6* | −16.1319 | 4.3983 | | |
| | | 7* | −6.5562 | 2.1222 | 1.63550 | 23.89 |
| | | 8* | −118.4118 | 0.3000 | | |
| | | 9* | 65.0122 | 6.3127 | 1.53500 | 55.73 |
| | | 10* | −13.4575 | 0.3000 | | |
| | | 11* | 183.8765 | 2.8890 | 1.76802 | 49.24 |
| | | 12* | −66.43199 | 25.0000 | | |
| | | EP | Observation Surface | | | |

Aspheric Data

| | 3rd Surface | 4th Surface | 5th Surface | 6th Surface | 7th Surface |
|---|---|---|---|---|---|
| K | 0.0000E+00 | 0.0000E+00 | 0.0000E+00 | −6.3872+00 | −8.6009E−01 |
| A4 | −2.0628E−04 | −1.7798E−04 | 0.0000E+00 | −7.4474E−05 | 4.9614E−04 |
| A6 | −3.3527E−06 | 3.2885E−07 | 0.0000E+00 | 6.4186E−07 | −2.2380E−06 |
| A8 | 5.8791E−08 | 1.9473E−09 | 0.0000E+00 | −3.4837E−09 | 5.8494E−09 |
| A10 | −2.0316E−10 | 0.0000E+00 | 0.0000E+00 | 8.3797E−12 | −5.6872E−12 |
| A12 | 0.0000E+00 | 0.0000E+00 | 0.0000E+00 | 0.0000E+00 | 0.0000E+00 |

TABLE 6-continued

NUMERICAL EXAMPLE 6

|   | 8th Surface | 9th Surface | 10th Surface | 11th Surface | 12th Surface |
|---|---|---|---|---|---|
| K | 0.0000E+00 | 0.0000E+00 | −1.7667E+00 | 0.0000E+00 | 6.8843E+00 |
| A4 | 8.1040E−05 | −3.5170E−05 | 9.3777E−05 | −1.1844E−04 | −1.2877E−04 |
| A6 | −7.3421E−07 | −1.6385E−07 | −2.0412E−07 | 5.0914E−07 | 6.6126E−07 |
| A8 | 3.4614E−09 | 1.1017E−09 | −3.1370E−09 | −4.2791E−10 | −1.3047E−09 |
| A10 | −8.7024E−12 | 0.0000E+00 | 1.3891E−11 | 0.0000E+00 | 2.4276E−12 |
| A12 | 0.0000E+00 | 0.0000E+00 | 0.0000E+00 | 0.0000E+00 | 0.0000E+00 |

| | Variable Distance | | | Focal Length of Each Lens | |
|---|---|---|---|---|---|
| Diopter [dptr] | −1.0 | −4.3 | 2.3 | f1 | 67.0403 |
| d2 | 5.1389 | 3.6462 | 6.4725 | f2 | 16.1148 |
| | | | | f3 | −11.0023 |
| | | | | f4 | 21.4414 |
| | | | | f5 | 63.8614 |

TABLE 7

NUMERICAL EXAMPLE 7

UNIT: mm
Surface Data

| | | Surface No | r | d | nd | vd |
|---|---|---|---|---|---|---|
| Focal Length f | 20.35 | 1 | ∞ | 0.7 | 1.52100 | 65.12 |
| Display Diagonal | 16.4 | 2 | ∞ | (variable) | | |
| Length 2H | | 3* | −29.2127 | 6.5000 | 1.53500 | 55.73 |
| 2ω [deg] | 43.5 | 4* | −12.3465 | 0.3000 | | |
| | | 5* | 10000.0000 | 6.4000 | 1.76802 | 49.24 |
| | | 6* | −15.5897 | 2.8934 | | |
| | | 7* | −9.0377 | 2.0490 | 1.63550 | 23.89 |
| | | 8* | −947.8017 | 0.9296 | | |
| | | 9* | −50.5301 | 6.5000 | 1.53500 | 55.73 |
| | | 10* | −14.6367 | 0.3000 | | |
| | | 11* | −5000 | 2.6648 | 1.76802 | 49.24 |
| | | 12* | −43.52986 | 25.0000 | | |
| | | EP | Observation Surface | | | |

Aspheric Data

|   | 3rd Surface | 4th Surface | 5th Surface | 6th Surface | 7th Surface |
|---|---|---|---|---|---|
| K | 0.0000E+00 | 0.0000E+00 | 0.0000E+00 | −8.7122E−01 | −5.5283E−01 |
| A4 | −6.4432E−05 | 1.7162E−04 | 0.0000E+00 | −4.1368E−05 | 2.6230E−04 |
| A6 | −2.7630E−06 | −7.7544E−07 | 0.0000E+00 | 9.0862E−07 | −9.0958E−07 |
| A8 | 6.2860E−08 | 8.7148E−09 | 0.0000E+00 | −6.6561E−09 | −1.8542E−09 |
| A10 | −2.7569E−10 | 1.1907E−11 | 0.0000E+00 | 1.6357E−11 | 3.3484E−11 |
| A12 | 0.0000E+00 | 0.0000E+00 | 0.0000E+00 | 0.0000E+00 | 0.0000E+00 |

|   | 8th Surface | 9th Surface | 10th Surface | 11th Surface | 12th Surface |
|---|---|---|---|---|---|
| K | 0.0000E+00 | 0.0000E+00 | −1.8632E+00 | 0.0000E+00 | −1.1262E+00 |
| A4 | 3.6528E−05 | 5.9399E−05 | −4.9828E−05 | −1.1034E−04 | −7.0878E−05 |
| A6 | −8.7802E−07 | −1.1252E−07 | 5.8183E−07 | 1.3906E−07 | −1.6752E−07 |
| A8 | 4.4695E−09 | −6.0690E−12 | −2.3273E−09 | 2.9331E−09 | 3.8443E−09 |
| A10 | −7.0348E−12 | 0.0000E+00 | 2.2602E−12 | −8.0647E−12 | −8.5776E−12 |
| A12 | 0.0000E+00 | 0.0000E+00 | 0.0000E+00 | 0.0000E+00 | 0.0000E+00 |

| | Variable Distance | | | Focal Length of Each Lens | |
|---|---|---|---|---|---|
| Diopter [dptr] | −1.0 | −4.3 | 2.3 | f1 | 35.2380 |
| d2 | 5.0122 | 3.5399 | 6.3625 | f2 | 20.2726 |
| | | | | f3 | −14.3703 |
| | | | | f4 | 36.2280 |
| | | | | f5 | 57.1625 |

TABLE 8

NUMERICAL EXAMPLE 8

UNIT: mm
Surface Data

|  |  | Surface No | r | d | nd | vd |
|---|---|---|---|---|---|---|
| Focal Length f | 20.38 | 1 | ∞ | 0.7 | 1.52100 | 65.12 |
| Display Diagonal | 16.4 | 2 | ∞ | (variable) | | |
| Length 2H | | 3* | −16.2571 | 4.4746 | 1.53500 | 55.73 |
| 2ω [deg] | 43.5 | 4* | −12.4055 | 0.3000 | | |
| | | 5* | 75.0000 | 6.4000 | 1.76802 | 49.24 |
| | | 6* | −17.8934 | 3.1018 | | |
| | | 7* | −9.4869 | 2.2000 | 1.63550 | 23.89 |
| | | 8* | −140.0591 | 0.7109 | | |
| | | 9* | −48.3725 | 6.4262 | 1.53500 | 55.73 |
| | | 10* | −15.3112 | 0.3000 | | |
| | | 11* | −5000 | 3.1670 | 1.76802 | 49.24 |
| | | 12* | −35.66786 | 25.0000 | | |
| | | EP | Observation Surface | | | |

Aspheric Data

|  | 3rd Surface | 4th Surface | 5th Surface | 6th Surface | 7th Surface |
|---|---|---|---|---|---|
| K | 0.0000E+00 | 0.0000E+00 | 0.0000E+00 | 5.5765E−02 | −5.3707E−01 |
| A4 | 2.1904E−04 | 3.4328E−04 | 0.0000E+00 | −7.0951E−05 | 1.4637E−04 |
| A6 | −4.9314E−06 | −2.3764E−06 | 0.0000E+00 | 1.6810E−06 | 4.7023E−07 |
| A8 | 8.2046E−08 | 1.9799E−08 | 0.0000E+00 | −1.2964E−08 | −9.7919E−09 |
| A10 | −4.3877E−10 | 4.9162E−11 | 0.0000E+00 | 3.7630E−11 | 4.3134E−11 |
| A12 | 5.8254E−13 | −5.1863E−13 | 0.0000E+00 | 0.0000E+00 | 0.0000E+00 |

|  | 8th Surface | 9th Surface | 10th Surface | 11th Surface | 12th Surface |
|---|---|---|---|---|---|
| K | 0.0000E+00 | 0.0000E+00 | 6.2569E−02 | 0.0000E+00 | −7.3906E+00 |
| A4 | 5.1617E−05 | 1.9185E−04 | 9.2833E−05 | −1.0049E−04 | −9.8835E−05 |
| A6 | −3.2981E−07 | −1.4681E−06 | −1.8628E−07 | 7.3982E−08 | 2.3404E−07 |
| A8 | −3.6264E−10 | −2.8358E−09 | −1.3749E−09 | 2.2361E−09 | 1.7403E−10 |
| A10 | 7.3243E−12 | 1.7211E−11 | 1.6213E−11 | −3.5927E−12 | 3.2301E−12 |
| A12 | −1.3167E−14 | −7.0509E−14 | −3.1295E−14 | −1.2787E−14 | −1.5556E−14 |

| Variable Distance | | | | Focal Length of Each Lens | |
|---|---|---|---|---|---|
| Diopter [dptr] | −1.0 | −4.3 | 2.3 | f1 | 69.6647 |
| d2 | 5.1426 | 3.6790 | 6.5003 | f2 | 19.3907 |
| | | | | f3 | −16.1183 |
| | | | | f4 | 39.2164 |
| | | | | f5 | 46.7620 |

TABLE 9

NUMERICAL EXAMPLE 9

UNIT: mm
Surface Data

|  |  | Surface No | r | d | nd | vd |
|---|---|---|---|---|---|---|
| Focal Length f | 20.29 | 1 | ∞ | 0.7 | 1.52100 | 65.12 |
| Display Diagonal | 16.4 | 2 | ∞ | (variable) | | |
| Length 2H | | 3* | −653.2540 | 6.5000 | 1.53500 | 55.73 |
| 2ω [deg] | 43.0 | 4* | −36.1701 | 0.3000 | | |
| | | 5* | 140.3264 | 6.4000 | 1.85135 | 40.10 |
| | | 6* | −13.9879 | 3.0999 | | |
| | | 7* | −9.1712 | 2.2000 | 1.63550 | 23.89 |
| | | 8* | 260.3642 | 1.0109 | | |
| | | 9* | −89.0873 | 6.5000 | 1.53500 | 55.73 |
| | | 10* | −15.1344 | 0.3000 | | |
| | | 11* | −1837.858 | 3.4420 | 1.61686 | 60.41 |
| | | 12* | −35.20942 | 25.0000 | | |
| | | EP | Observation Surface | | | |

TABLE 9-continued

NUMERICAL EXAMPLE 9

Aspheric Data

|     | 3rd Surface | 4th Surface | 5th Surface | 6th Surface | 7th Surface |
|-----|-------------|-------------|-------------|-------------|-------------|
| K   | 0.0000E+00  | 0.0000E+00  | 0.0000E+00  | −1.4801E+00 | −8.4337E−01 |
| A4  | −4.2278E−04 | −1.1501E−04 | 0.0000E+00  | 4.3907E−05  | 2.2800E−04  |
| A6  | 3.1203E−06  | 6.8870E−07  | 0.0000E+00  | −1.4295E−07 | −1.2984E−06 |
| A8  | 6.3114E−09  | 2.3110E−09  | 0.0000E+00  | −4.1750E−10 | 3.9708E−09  |
| A10 | −7.2618E−11 | −8.6544E−12 | 0.0000E+00  | 2.0966E−12  | −1.2430E−11 |
| A12 | 0.0000E+00  | 0.0000E+00  | 0.0000E+00  | 0.0000E+00  | 0.0000E+00  |

|     | 8th Surface | 9th Surface | 10th Surface | 11th Surface | 12th Surface |
|-----|-------------|-------------|--------------|--------------|--------------|
| K   | 0.0000E+00  | 0.0000E+00  | −5.3804E−01  | 0.0000E+00   | 2.5879E+00   |
| A4  | −4.0809E−06 | 1.8629E−05  | 3.4998E−05   | −8.1339E−05  | −5.5568E−05  |
| A6  | −6.5819E−08 | 9.9521E−09  | 6.2162E−08   | 4.4387E−08   | 1.0208E−09   |
| A8  | −3.1372E−10 | 1.2974E−10  | −5.6845E−11  | 1.0606E−09   | 8.7943E−10   |
| A10 | 1.3115E−12  | −9.4334E−13 | −1.1443E−12  | −2.7046E−12  | −9.2046E−13  |
| A12 | 0.0000E+00  | 0.0000E+00  | 0.0000E+00   | 0.0000E+00   | 0.0000E+00   |

|                | Variable Distance |         |         | Focal Length of Each Lens |           |
|----------------|-------------------|---------|---------|---------------------------|-----------|
| Diopter [dptr] | −1.0              | −4.3    | 2.3     | f1                        | 71.3086   |
| d2             | 4.6487            | 3.1627  | 5.9877  | f2                        | 15.2314   |
|                |                   |         |         | f3                        | −13.8962  |
|                |                   |         |         | f4                        | 33.0650   |
|                |                   |         |         | f5                        | 58.1507   |

TABLE 10

NUMERICAL EXAMPLE 10

UNIT: mm
Surface Data

|                    |        | Surface No | r          | d          | nd      | vd     |
|--------------------|--------|------------|------------|------------|---------|--------|
| Focal Length f     | 20.31  | 1          | ∞          | 0.7        | 1.52100 | 65.12  |
| Display Diagonal   | 16.4   | 2          | ∞          | (variable) |         |        |
| Length 2H          |        | 3*         | 1442.8120  | 6.5000     | 1.58946 | 32.36  |
| 2ω [deg]           | 43.3   | 4*         | −50.9730   | 0.3000     |         |        |
|                    |        | 5*         | 133.6694   | 6.6031     | 1.84137 | 41.01  |
|                    |        | 6*         | −13.5000   | 3.1004     |         |        |
|                    |        | 7*         | −7.8216    | 2.2000     | 1.63550 | 23.89  |
|                    |        | 8*         | −673.1108  | 0.6004     |         |        |
|                    |        | 9*         | −730.3613  | 6.4774     | 1.53500 | 55.73  |
|                    |        | 10*        | −14.2868   | 0.3000     |         |        |
|                    |        | 11*        | −5000.211  | 3.3939     | 1.68200 | 55.13  |
|                    |        | 12*        | −40.4794   | 25.0000    |         |        |
|                    |        | EP         | Observation Surface |   |         |        |

Aspheric Data

|     | 3rd Surface | 4th Surface | 5th Surface | 6th Surface | 7th Surface |
|-----|-------------|-------------|-------------|-------------|-------------|
| K   | 0.0000E+00  | 0.0000E+00  | 0.0000E+00  | −2.2201E+00 | −7.5175E−01 |
| A4  | −2.7519E−04 | −1.0802E−04 | 0.0000E+00  | 4.1531E−07  | 3.6762E−04  |
| A6  | −2.0088E−06 | 9.0057E−08  | 0.0000E+00  | 1.3965E−07  | −2.1204E−06 |
| A8  | 5.8394E−08  | 5.9370E−09  | 0.0000E+00  | −2.5057E−09 | 9.2022E−09  |
| A10 | −2.4208E−10 | −1.4576E−11 | 0.0000E+00  | 9.2726E−12  | −1.5977E−11 |
| A12 | 0.0000E+00  | 0.0000E+00  | 0.0000E+00  | 0.0000E+00  | 0.0000E+00  |

|     | 8th Surface | 9th Surface | 10th Surface | 11th Surface | 12th Surface |
|-----|-------------|-------------|--------------|--------------|--------------|
| K   | 0.0000E+00  | 0.0000E+00  | −1.8915E+00  | 0.0000E+00   | 6.4247E−01   |
| A4  | 3.6817E−06  | −1.6741E−06 | 6.6361E−05   | −8.3653E−05  | −9.7780E−05  |
| A6  | −1.4105E−07 | −2.4996E−08 | −5.4653E−07  | 2.1545E−07   | 5.0708E−07   |
| A8  | 1.0005E−09  | 1.5535E−10  | 1.2599E−09   | 1.7854E−10   | −1.5087E−09  |
| A10 | −2.9912E−12 | 0.0000E+00  | −3.8434E−13  | −7.5124E−13  | 2.7296E−12   |
| A12 | 0.0000E+00  | 0.0000E+00  | 0.0000E+00   | 0.0000E+00   | 0.0000E+00   |

TABLE 10-continued

NUMERICAL EXAMPLE 10

| | Variable Distance | | | Focal Length of Each Lens | |
|---|---|---|---|---|---|
| Diopter [dptr] | −1.0 | −4.3 | 2.3 | f1 | 83.6577 |
| d2 | 4.6706 | 3.1900 | 6.0140 | f2 | 14.8784 |
| | | | | f3 | −12.4684 |
| | | | | f4 | 27.1514 |
| | | | | f5 | 59.8214 |

TABLE 11

NUMERICAL EXAMPLE 11

UNIT: mm
Surface Data

| | | Surface No | r | d | nd | vd |
|---|---|---|---|---|---|---|
| Focal Length f | 20.32 | 1 | ∞ | 0.7 | 1.52100 | 65.12 |
| Display Diagonal | 16.4 | 2 | ∞ | (variable) | | |
| Length 2H | | 3* | 5030.3660 | 6.5000 | 1.63550 | 23.89 |
| 2ω [deg] | 43.3 | 4* | −34.7355 | 0.3000 | | |
| | | 5* | 10000.0000 | 6.3000 | 1.76802 | 49.24 |
| | | 6* | −13.5000 | 3.6377 | | |
| | | 7* | −6.9270 | 2.2000 | 1.63550 | 23.89 |
| | | 8* | −109.4637 | 0.5350 | | |
| | | 9* | 122.1658 | 5.8883 | 1.53500 | 55.73 |
| | | 10* | −12.4310 | 0.3000 | | |
| | | 11* | −4981.262 | 3.2350 | 1.76802 | 49.24 |
| | | 12* | −50.32487 | 25.0000 | | |
| | | EP | Observation Surface | | | |

Aspheric Data

| | 3rd Surface | 4th Surface | 5th Surface | 6th Surface | 7th Surface |
|---|---|---|---|---|---|
| K | 0.0000E+00 | 0.0000E+00 | 0.0000E+00 | −5.0748E+00 | −8.3287E−01 |
| A4 | −7.4158E−05 | 1.1392E−04 | 6.3641E−05 | −1.9458E−04 | 4.8820E−04 |
| A6 | −5.1805E−06 | −1.2502E−06 | −2.7121E−07 | 2.0358E−06 | −3.1467E−06 |
| A8 | 7.5479E−08 | −3.4113E−09 | 0.0000E+00 | −9.4465E−09 | 7.2757E−09 |
| A10 | −2.1291E−10 | 9.1440E−11 | 0.0000E+00 | 1.4442E−11 | 3.5354E−11 |
| A12 | −4.8097E−13 | −2.6647E−13 | 0.0000E+00 | 0.0000E+00 | −2.0252E−13 |

| | 8th Surface | 9th Surface | 10th Surface | 11th Surface | 12th Surface |
|---|---|---|---|---|---|
| K | 0.0000E+00 | 0.0000E+00 | −3.2006E−01 | 0.0000E+00 | −7.7217E+00 |
| A4 | −1.7006E−05 | −1.9082E−04 | 2.1129E−04 | −5.8969E−05 | −1.3369E−04 |
| A6 | −1.3862E−07 | 1.5627E−06 | −1.3512E−06 | 9.5717E−08 | 9.6671E−07 |
| A8 | 2.7469E−09 | −9.7402E−09 | 3.6440E−09 | −2.0808E−10 | −5.0320E−09 |
| A10 | −1.5196E−11 | 4.6412E−11 | 1.1973E−11 | 2.1642E−12 | 1.1003E−11 |
| A12 | 2.7659E−14 | −9.2047E−14 | −2.9096E−14 | 0.0000E+00 | 3.3478E−15 |

| | Variable Distance | | | Focal Length of Each Lens | |
|---|---|---|---|---|---|
| Diopter [dptr] | −1.0 | −4.3 | 2.3 | f1 | 54.3103 |
| d2 | 4.3034 | 2.8358 | 5.6487 | f2 | 17.5588 |
| | | | | f3 | −11.7342 |
| | | | | f4 | 21.4161 |
| | | | | f5 | 66.1754 |

TABLE 12

NUMERICAL EXAMPLE 12

UNIT: mm
Surface Data

| | | Surface No | r | d | nd | vd |
|---|---|---|---|---|---|---|
| Focal Length f | 20.12 | 1 | ∞ | 0.7 | 1.52100 | 65.12 |
| Display Diagonal | 16.4 | 2 | ∞ | (variable) | | |
| Length 2H | | 3* | 20.9670 | 6.5000 | 1.53500 | 55.73 |
| 2ω [deg] | 40.2 | 4* | −56.5800 | 1.1697 | | |

TABLE 12-continued

NUMERICAL EXAMPLE 12

| | | | |
|---|---|---|---|
| 5* | 525.8788 | 6.4000 | 1.76802 49.24 |
| 6* | −18.1984 | 2.4446 | |
| 7* | −12.3463 | 2.2000 | 1.63550 23.89 |
| 8* | −299.9893 | 0.6002 | |
| 9* | −299.9953 | 4.9451 | 1.53500 55.73 |
| 10* | −24.9050 | 0.3009 | |
| 11* | −253.157 | 4.2832 | 1.53500 55.73 |
| 12* | −25.69055 | 1.8147 | |
| 13* | −153.5472 | 2.2170 | 1.53500 55.73 |
| 14* | −37.30241 | 25.0000 | |
| EP | Observation Surface | | |

Aspheric Data

| | 3rd Surface | 4th Surface | 5th Surface | 6th Surface | 7th Surface | 8th Surface |
|---|---|---|---|---|---|---|
| K | 0.0000E+00 | 0.0000E+00 | 1.6352E+03 | 5.4765E−02 | −1.0337E−01 | 0.0000E+00 |
| A4 | −6.3067E−04 | −4.0322E−05 | −4.9445E−06 | −9.2790E−07 | 1.5209E−05 | 2.6975E−07 |
| A6 | 5.0990E−06 | 1.1320E−07 | −1.4399E−08 | −4.3356E−08 | 2.5479E−07 | −9.7573E−09 |
| A8 | −3.5447E−08 | 6.1038E−10 | 0.0000E+00 | 3.3474E−10 | 3.3754E−10 | −5.6571E−12 |
| A10 | 0.0000E+00 | 1.0322E−11 | 0.0000E+00 | 0.0000E+00 | 4.7825E−12 | 4.4055E−14 |
| A12 | 0.0000E+00 | 0.0000E+00 | 0.0000E+00 | 0.0000E+00 | 0.0000E+00 | 0.0000E+00 |

| | 9th Surface | 10th Surface | 11th Surface | 12th Surface | 13th Surface | 14th Surface |
|---|---|---|---|---|---|---|
| K | 0.0000E+00 | 4.7077E−01 | 0.0000E+00 | −5.6266E−01 | 0.0000E+00 | 8.5078E−01 |
| A4 | 0.0000E+00 | −6.3805E−07 | 0.0000E+00 | 5.5587E−06 | 0.0000E+00 | 7.4053E−06 |
| A6 | 0.0000E+00 | 2.3012E−08 | 0.0000E+00 | 1.7429E−10 | 0.0000E+00 | 1.0805E−08 |
| A8 | 0.0000E+00 | −9.5137E−11 | 0.0000E+00 | −9.5227E−11 | 0.0000E+00 | 1.2935E−10 |
| A10 | 0.0000E+00 | 0.0000E+00 | 0.0000E+00 | 0.0000E+00 | 0.0000E+00 | 0.0000E+00 |
| A12 | 0.0000E+00 | 0.0000E+00 | 0.0000E+00 | 0.0000E+00 | 0.0000E+00 | 0.0000E+00 |

| | Variable Distance | | | Focal Length of Each Lens | |
|---|---|---|---|---|---|
| Diopter [dptr] | −1.0 | −4.3 | −1.4 | f1 | 29.4548 |
| d2 | 3.0437 | 1.5287 | 2.87899 | f2 | 23.0203 |
| | | | | f3 | −20.3219 |
| | | | | f4 | 50.4499 |
| | | | | f5 | 53.0947 |
| | | | | f6 | 91.4901 |

TABLE 13

| | (1) nd2 | (2) f2/f1 | (3) f2/f3 | (4) f3/f | (5) f2/f | (6) f4/f |
|---|---|---|---|---|---|---|
| Ex. 1 | 1.76802 | 0.2486 | −1.1402 | −0.7993 | 0.9114 | 1.8733 |
| Ex. 2 | 1.76802 | 0.4320 | −1.2893 | −0.7597 | 0.9795 | 1.8698 |
| Ex. 3 | 1.76802 | 0.7613 | −1.4574 | −0.7592 | 1.1065 | 1.8940 |
| Ex. 4 | 1.76802 | 0.0855 | −1.0599 | −0.6938 | 0.7353 | 1.2928 |
| Ex. 5 | 1.76802 | 0.1355 | −1.1913 | −0.6361 | 0.7578 | 1.5581 |
| Ex. 6 | 1.85135 | 0.2404 | −1.4647 | −0.5429 | 0.7951 | 1.0580 |
| Ex. 7 | 1.76802 | 0.5753 | −1.4107 | −0.7063 | 0.9964 | 1.7807 |
| Ex. 8 | 1.76802 | 0.2783 | −1.2030 | −0.7909 | 0.9515 | 1.9243 |
| Ex. 9 | 1.85135 | 0.2136 | −1.0961 | −0.6848 | 0.7506 | 1.6294 |
| Ex. 10 | 1.84137 | 0.1778 | −1.1933 | −0.6138 | 0.7325 | 1.3367 |
| Ex. 11 | 1.76802 | 0.3233 | −1.4964 | −0.5774 | 0.8640 | 1.0539 |
| Ex. 12 | 1.76802 | 0.7815 | −1.1328 | −1.0103 | 1.1444 | 2.5080 |

| | (7) f5/f | (8) (R22 + R21)/ (R22 − R21) | (9) (R32 + R31)/ (R32 − R31) | (10) TL/f | (11) Db/f | (12) H/f |
|---|---|---|---|---|---|---|
| Ex. 1 | 2.6217 | −0.6312 | 1.0864 | 1.3389 | 0.2726 | 0.4028 |
| Ex. 2 | 2.4407 | −0.8806 | 1.1098 | 1.3175 | 0.2967 | 0.4032 |
| Ex. 3 | 2.9493 | −0.9936 | 1.0943 | 1.4362 | 0.2724 | 0.4059 |
| Ex. 4 | 2.9799 | −0.6895 | 1.7233 | 1.4842 | 0.2018 | 0.4042 |
| Ex. 5 | 2.2665 | −0.6949 | 1.4794 | 1.4409 | 0.2414 | 0.4035 |
| Ex 6 | 3.1510 | −0.6460 | 1.1172 | 1.4567 | 0.2763 | 0.4049 |
| Ex. 7 | 2.8096 | −0.9969 | 1.0193 | 1.4026 | 0.2690 | 0.4033 |
| Ex. 8 | 2.2945 | −0.6148 | 1.1453 | 1.3288 | 0.2749 | 0.4027 |
| Ex. 9 | 2.8657 | −0.8187 | 0.9319 | 1.4662 | 0.2518 | 0.4044 |
| Ex. 10 | 2.9450 | −0.8165 | 1.0235 | 1.4511 | 0.2526 | 0.4040 |
| Ex. 11 | 3.2564 | −0.9973 | 1.1351 | 1.4219 | 0.2344 | 0.4038 |
| Ex. 12 | 2.6395 | −0.9331 | 1.0858 | 1.6343 | 0.1742 | 0.4079 |

Image Pickup Apparatus

Figure 25:
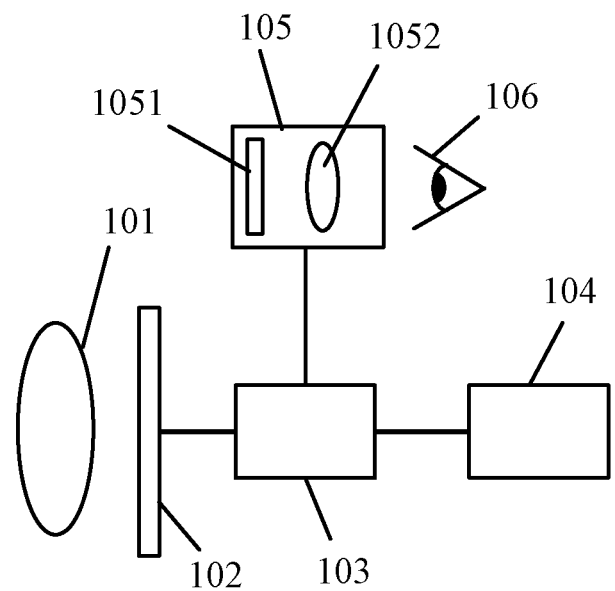
FIG. 25 illustrates an image pickup apparatus having the display optical system according to any one of Examples 1 to 12.

FIG. 25 illustrates an image pickup apparatus such as a digital camera or a video camera using the display optical system according to any one of the above examples as a finder optical system. An object image formed by an imaging optical system 101 is converted into an electric signal by an image sensor 102, which is a photoelectric conversion element. Thereby, the image sensor 102 images the object via the imaging optical system 101. A CCD sensor, a CMOS sensor, or the like is used as the image sensor 102.

An output signal from the image sensor 102 is processed in an image processing circuit 103, and an image is generated. The generated image is recorded on a recording medium 104 such as a semiconductor memory, magnetic tape, optical disc, or the like. The image generated by the image processing circuit 103 is displayed on a display element 1051 (ID) in an EVF unit 105. The display element 1051 includes a liquid crystal display element (LCD), an organic EL element, or the like.

The EVF unit 105 includes a finder optical system 1052 according to any one of the above examples. An observer 106 can observe the image displayed on the display element 1051 through finder optical system 1052.

Using the display optical system according to each example as a finder optical system in this manner can provide an image pickup apparatus having an EVF unit 105 that is compact and can provide excellent image observation at a wide viewing angle.

Display Apparatus

Figure 26:
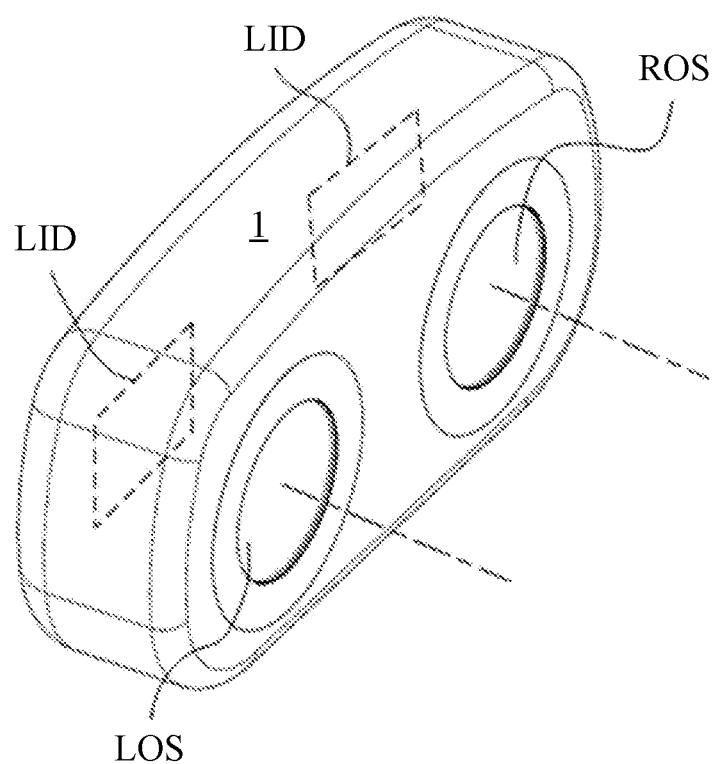
FIG. 26 illustrates a display apparatus having the display optical system according to any one of Examples 1 to 12.

FIG. 26 illustrates an HMD as an image display apparatus using the display optical system according to any one of the above examples. The HMD is mounted on the head of the observer (in front of his eyes) by an unillustrated mounting gear.

The HMD includes right-eye display element RID and left-eye display element LID, right-eye display optical system ROS that enables the observer to observe the image displayed on the right-eye display element RID with his right eye, and left-eye display optical system LOS that enables the observer to observe the image displayed on the left-eye display element LID with his left eye. Each display element displays an image input from a computer or the like outside the HMD.

Using the display optical system according to any one of the above examples for each of the right-eye and left-eye display optical systems ROS and LOS can realize a compact HMD that can provide excellent image observation at a wide viewing angle.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-036226, filed on Mar. 9, 2022, which is hereby incorporated by reference herein in its entirety.

What is claimed is:

1. A display optical system configured to enable an image displayed on a display element to be observed, the display optical system comprising, in order from a display element side to an observation side:
   a first lens having positive refractive power;
   a second lens having positive refractive power;
   a third lens having negative refractive power;
   a fourth lens having positive refractive power; and
   a fifth lens having positive refractive power,
   wherein each of the first lens, second lens, third lens, fourth lens, and fifth lens is a single lens that is not a cemented lens, and
   wherein the following inequalities are satisfied:

$1.700 \leq nd2$ $0.000 < f2/f1 \leq 0.790$ $0.10 \leq Db/f \leq 0.50$ where f1 is a focal length of the first lens, f2 is a focal length of the second lens, nd2 is a refractive index of the second lens for d-line, Db is a distance on an optical axis from the display element to a lens surface of the display optical system closest to the display element, and f is a focal length of the display optical system.

2. The display optical system according to claim 1, wherein the following inequality is satisfied:

$-2.00 \leq f2/f3 \leq -0.80$ where f3 is a focal length of the third lens.

3. The display optical system according to claim 1, wherein the following inequality is satisfied:

$-2.00 \leq f3/f \leq -0.40$ where f3 is a focal length of the third lens.

4. The display optical system according to claim 1, wherein the following inequality is satisfied:

$0.50 \leq f2/f \leq 2.00$.

5. The display optical system according to claim 1, wherein the following inequality is satisfied:

$0.80 \leq f4/f \leq 5.00$ where f4 is a focal length of the fourth lens.

6. The display optical system according to claim 1, wherein the following inequality is satisfied:

$1.50 \leq f5/f \leq 5.00$ where f5 is a focal length of the fifth lens.

7. The display optical system according to claim 1, wherein the following inequality is satisfied:

$-1.00 \leq (R22+R21)/(R22-R21) < 0.00$ where R21 is a radius of curvature on the display element side of a lens surface of the second lens, and R22 is a radius of curvature on the observation side of a lens surface of the second lens.

8. The display optical system according to claim 1, wherein the following inequality is satisfied:

$0.50 \leq (R32+R31)/(R32-R31) \leq 3.00$ where R31 is a curvature radius on the display element side of a lens surface of the third lens, and R32 is a curvature radius on an observation side of a lens surface of the third lens.

9. The display optical system according to claim 1, wherein the second lens is a biconvex lens.

10. The display optical system according to claim 1, wherein the third lens is a meniscus lens with a concave surface facing the display element side.

11. The display optical system according to claim 1, wherein the fifth lens is a meniscus lens with a convex surface facing the observation side.

12. The display optical system according to claim 1, wherein a lens surface on the display element side of the first lens is a curved surface with an inflection point.

13. The display optical system according to claim 1, wherein the following inequality is satisfied:

$1.10 \leq TL/f \leq 1.90$ where TL is a distance on an optical axis from a lens surface of the display optical system closest to the display element to a lens surface closest to an observation position of the display optical system.

14. The display optical system according to claim 1, wherein a diopter is adjusted by moving the display optical system relative to the display surface so as to change the distance Db.

15. The display optical system according to claim 1, wherein the following inequality is satisfied:

$0.32 \leq H/f \leq 0.50$ where H is a half diagonal length of a display surface of the display element.

16. An image pickup apparatus comprising:
   an image sensor configured to capture an object via an imaging optical system;
   a display element configured to display an image generated using a signal from the image sensor; and
   a display optical system that enables the image displayed on the display element to be observed, wherein the display optical system includes, in order from a display element side to an observation side:
a first lens having positive refractive power;
a second lens having positive refractive power;
a third lens having negative refractive power;
a fourth lens having positive refractive power; and
a fifth lens having positive refractive power,
wherein each of the first lens, second lens, third lens, fourth lens, and fifth lens is a single lens that is not a cemented lens, and
wherein the following inequalities are satisfied:

$1.700 \leq nd2$ $0.000 < f2/f1 \leq 0.790$ $0.10 \leq Db/f \leq 0.50$ where f1 is a focal length of the first lens, f2 is a focal length of the second lens, and nd2 is a refractive index of the second lens for d-line, Db is a distance on an optical axis from the display element to a lens surface of the display optical system closest to the display element, and f is a focal length of the display optical system.

17. A display apparatus comprising:
a display element configured to display an input image; and
a display optical system configured to enable an image displayed on the display element to be observed,
wherein the display optical system includes, in order from a display element side to an observation side:
a first lens having positive refractive power;
a second lens having positive refractive power;
a third lens having negative refractive power;
a fourth lens having positive refractive power; and
a fifth lens having positive refractive power,
wherein each of the first lens, second lens, third lens, fourth lens, and fifth lens is a single lens that is not a cemented lens, and
wherein the following inequalities are satisfied:

$1.700 \leq nd2$ $0.000 < f2/f1 \leq 0.790$ $0.10 \leq Db/f \leq 0.50$ where f1 is a focal length of the first lens, f2 is a focal length of the second lens, and nd2 is a refractive index of the second lens for d-line, Db is a distance on an optical axis from the display element to a lens surface of the display optical system closest to the display element, and f is a focal length of the display optical system.

18. A display optical system configured to enable an image displayed on a display element to be observed, the display optical system comprising, in order from a display element side to an observation side:
a first lens having positive refractive power;
a second lens having positive refractive power;
a third lens having negative refractive power;
a fourth lens having positive refractive power; and
a fifth lens having positive refractive power,
wherein each of the first lens, second lens, third lens, fourth lens, and fifth lens is a single lens that is not a cemented lens, and
wherein the following inequalities are satisfied:

$1.700 \leq nd2$ $0.000 < f2/f1 \leq 0.790$ $0.32 \leq H/f \leq 0.50$ where f1 is a focal length of the first lens, f2 is a focal length of the second lens, nd2 is a refractive index of the second lens for d-line, H is a half diagonal length of a display surface of the display element, and f is a focal length of the display optical system.

* * * * *